(12) United States Patent
Amemiya

(10) Patent No.: US 11,593,176 B2
(45) Date of Patent: Feb. 28, 2023

(54) COMPUTER-READABLE RECORDING MEDIUM STORING TRANSFER PROGRAM, TRANSFER METHOD, AND TRANSFERRING DEVICE

(71) Applicant: FUJITSU LIMITED, Kawasaki (JP)

(72) Inventor: Kouichirou Amemiya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 368 days.

(21) Appl. No.: 16/790,004

(22) Filed: Feb. 13, 2020

(65) Prior Publication Data

US 2020/0293373 A1    Sep. 17, 2020

(30) Foreign Application Priority Data

Mar. 12, 2019 (JP) .............................. JP2019-045263

(51) Int. Cl.
*G06F 9/46* (2006.01)
*G06F 9/50* (2006.01)
(Continued)

(52) U.S. Cl.
CPC .............. *G06F 9/505* (2013.01); *G06F 3/067* (2013.01); *G06F 3/0614* (2013.01);
(Continued)

(58) Field of Classification Search
CPC ....................................................... G06F 9/505
(Continued)

(56) References Cited

U.S. PATENT DOCUMENTS 11,190,231 B1 * 11/2021 Wang .................... H04W 72/08
2003/0172163 A1    9/2003 Fujita et al.
(Continued)

FOREIGN PATENT DOCUMENTS

JP    2003-256310 A    9/2003
JP    2008-083942 A    4/2008
(Continued)

OTHER PUBLICATIONS

Notice of Reasons for Refusal dated Oct. 6, 2022 in corresponding Japanese Patent Application No. 2019-045263A (4 pages) (3 pages English Translation).
Notice of Reasons for Refusal dated Oct. 11, 2022 in corresponding Japanese Patent Application No. 2019-045263A (4 pages) (3 pages English Translation).
(Continued)

*Primary Examiner* — Mehran Kamran
(74) *Attorney, Agent, or Firm* — Staas & Halsey LLP

(57) ABSTRACT

A transfer method is performed by an information processing apparatus. The method includes: selecting, based on a load status of the information processing apparatus, candidate transfer data that is among the received data and to be transferred to one or more other information processing apparatuses; selecting, based on load statuses of multiple other information processing apparatuses, one or more candidate transfer destination apparatuses among the multiple other information processing apparatuses as candidate transfer destinations of the data; determining, based on throughput between the information processing apparatus and the candidate transfer destination apparatuses, data to be transferred among the candidate transfer data, transfer destination apparatuses of the data to be transferred among the candidate transfer destination apparatuses, and the sizes of data groups including the data to be transferred; and transferring, to the transfer destination apparatuses determined for the determined data groups, the determined data to be transferred.

5 Claims, 23 Drawing Sheets

(51) Int. Cl.
 *G06F 9/54* (2006.01)
 *G06F 3/06* (2006.01)
(52) U.S. Cl.
 CPC .......... *G06F 3/0646* (2013.01); *G06F 3/0659* (2013.01); *G06F 3/0683* (2013.01); *G06F 9/5016* (2013.01); *G06F 9/542* (2013.01); *G06F 9/546* (2013.01); *G06F 2209/508* (2013.01)
(58) Field of Classification Search
 USPC ........................................................ 718/104
 See application file for complete search history.

(56) References Cited

U.S. PATENT DOCUMENTS

| | | | | |
|---|---|---|---|---|
| 2004/0010617 | A1* | 1/2004 | Akahane | H04L 47/822 709/239 |
| 2008/0229306 | A1 | 9/2008 | Omori | |
| 2012/0002549 | A1* | 1/2012 | Dempo | H04L 45/125 370/235 |
| 2012/0054457 | A1* | 3/2012 | Sasage | G06F 3/067 711/E12.001 |
| 2013/0064135 | A1* | 3/2013 | Matoba | H04L 67/125 370/254 |
| 2013/0111154 | A1* | 5/2013 | Taniyama | G06F 3/061 711/E12.001 |
| 2013/0212349 | A1* | 8/2013 | Maruyama | G06F 11/3452 711/167 |
| 2014/0365681 | A1* | 12/2014 | Hamada | G06F 9/5083 709/235 |
| 2016/0077748 | A1* | 3/2016 | Kosen | G06F 3/0659 711/154 |
| 2017/0104815 | A1* | 4/2017 | Tao | H04L 67/1029 |
| 2017/0346725 | A1* | 11/2017 | Lapidous | H04L 47/27 |
| 2017/0351601 | A1* | 12/2017 | Matsuzawa | G06F 12/0238 |
| 2018/0052875 | A1* | 2/2018 | Ruan | H04L 67/1095 |
| 2019/0034383 | A1* | 1/2019 | Schmisseur | H04L 41/0677 |
| 2019/0138350 | A1* | 5/2019 | Kaneko | G06F 11/1482 |
| 2019/0272201 | A1* | 9/2019 | Aritsuka | G06F 9/5094 |
| 2020/0341819 | A1* | 10/2020 | Amemiya | G06F 9/5038 |
| 2021/0119902 | A1* | 4/2021 | Iijima | H04L 45/22 |

FOREIGN PATENT DOCUMENTS

| | | |
|---|---|---|
| JP | 2008-109499 A | 5/2008 |
| JP | 2008-226182 A | 9/2008 |
| JP | WO 2010/107105 A1 | 9/2010 |
| JP | 2013-143732 A | 7/2013 |
| JP | 2013-183440 A | 9/2013 |
| JP | 2015-232820 A | 12/2015 |
| JP | 2016-206858 A | 8/2016 |
| JP | 2017-91454 A | 5/2017 |

OTHER PUBLICATIONS

Notice of Reasons for Refusal dated Jan. 17, 2023 in corresponding Japanese Patent Application No. 2019-045263 (4 pages) (3 pages English Translation).

* cited by examiner

FIG. 4

| ID | ADDRESS | PORT | CPU UTILIZATION | CONSUMED CAPACITY OF BUFFER (MEMORY) | TOTAL CAPACITY OF BUFFER (MEMORY) | CONSUMED CAPACITY OF DISK | TOTAL CAPACITY OF DISK | DISK I/O |
|---|---|---|---|---|---|---|---|---|
| 1001 | 10.0.0.101 | 9001 | 30 [%] | 8 [GB] | 16 [GB] | 50 [GB] | 100 [GB] | 1 [GB/s] |

| MAXIMUM DISK I/O | EVENT DATA ITEM INPUT FREQUENCY | MAXIMUM EVENT DATA ITEM INPUT FREQUENCY | NETWORK DELAY | BANDWIDTH | AVERAGE WRITING DELAY | AVERAGE READING DELAY |
|---|---|---|---|---|---|---|
| 10 [GB/s] | 100 [events/s] | 1000 [events/s] | 1 [ms] | 1 [Gbps] | 10 [ms] | 10 [ms] |

FIG. 5

| DATA TYPE | DEADLINE |
|---|---|
| Topic#a | 1 [sec] |
| Topic#b | 10 [sec] |

FIG. 6

| DATA TYPE | EVENT DATA ITEM INPUT FREQUENCY | SIZE OF EVENT DATA ITEM |
|---|---|---|
| Topic#a | 10 [events/s] | 100 [Bytes] |

FIG. 7

| DATA TYPE |
|---|
| Topic#a |
| Topic#b |

FIG. 8

| ID |
|---|
| 1001 |
| 1002 |
| 1003 |

FIG. 9

| DATA TYPE | TRANSFER DESTINATION SERVER ID | RATIO | SIZE OF DATA GROUP |
|---|---|---|---|
| Topic#a | 1001 | 5 | 10 [KB] |
| | 1002 | 5 | 10 [KB] |
| Topic#b | 1003 | 10 | 20 [KB] |

FIG. 10

| HIGH MEMORY LOAD | HIGH DATA INPUT LOAD | HIGH DISK I/O LOAD |
|---|---|---|
| True | False | False |

FIG. 11

| FIELD | VALUE |
|---|---|
| SOURCE | 10.0.0.010, 0900 (DATA GENERATING CLIENT IP, port) |
| DESTINATION | 10.0.0.100, 9000 (DESTINATION SERVER IP, port) |
| SOURCE ID | 101 (DATA GENERATING CLIENT ID) |
| DATA TYPE | Topic#a |
| PAYLOAD | A="hoge", B="fuga", C=10, D=10, binary data |

FIG. 12

| FIELD | VALUE |
|---|---|
| SOURCE | 10.0.0.100, 9000 (SOURCE SERVER IP, port) |
| DESTINATION | 10.0.0.101, 9001 (DESTINATION SERVER IP, port) |
| SOURCE ID | 101 (DATA GENERATING CLIENT ID) |
| DATA TYPE | Topic#a |
| PAYLOAD | A="hoge", B="fuga", C=10, D=10, binary data |

FIG. 13

| FIELD | VALUE |
|---|---|
| SOURCE | 10.0.0.100, 9001 (SOURCE SERVER IP, port) |
| DESTINATION | 10.0.0.011, 0901 (DATA USING CLIENT IP, port) |
| SOURCE ID | 101 (DATA GENERATING CLIENT ID) |
| DATA TYPE | Topic#a |
| PAYLOAD | A="hoge", B="fuga", C=10, D=10, binary data |

FIG. 14

| FIELD | VALUE |
|---|---|
| SOURCE | 10.0.0.100, 9000 (SOURCE SERVER IP, port) |
| DESTINATION | 10.0.0.011, 0901 (DATA USING CLIENT IP, port) |
| SOURCE ID | 1001 (LOAD INFORMATION GENERATING SERVER ID) |
| CPU LOAD | 30 [%] (CPU UTILIZATION) |
| BUFFER (MEMORY) LOAD | 8 [GB], 16 [GB] (CONSUMED CAPACITY OF BUFFER (MEMORY), TOTAL CAPACITY OF BUFFER (MEMORY)) |
| DISK CAPACITY LOAD | 50 [GB], 100 [GB] (CONSUMED CAPACITY OF DISK, TOTAL CAPACITY OF DISK) |
| DISK I/O LOAD | 10 [GB/s], 10 [GB/s] (DISK I/O, MAXIMUM DISK I/O) |
| DATA INPUT LOAD | 100 [events/s], 1000 [events/s] (INPUT FREQUENCY [events/s], MAXIMUM INPUT FREQUENCY [events/s]) |

FIG. 15

| FIELD | VALUE |
|---|---|
| SOURCE | 10.0.0.100, 9000 (SOURCE IP) |
| DESTINATION | 10.0.0.100, 9001 (SERVER (TO BE MEASURED) IP) |
| TIMESTAMP | 20181019165131.1539935491 |

FIG. 16

| FIELD | VALUE |
|---|---|
| SOURCE | 10.0.0.100, 9001 (SERVER (TO BE MEASURED) IP) |
| DESTINATION | 10.0.0.100, 9000 (SOURCE IP) |
| TIMESTAMP | 20181019165131.1539935491 |

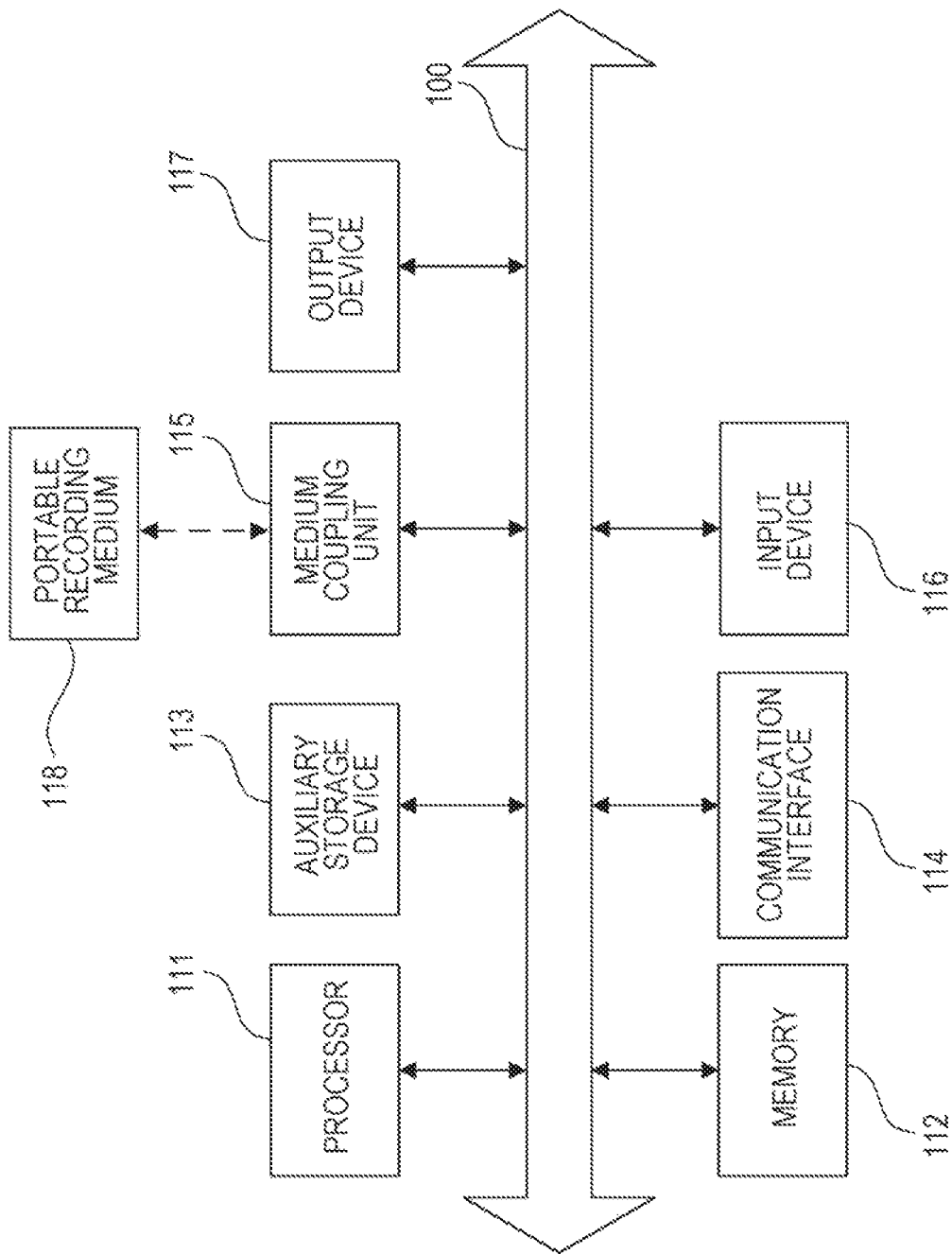

COMPUTER-READABLE RECORDING MEDIUM STORING TRANSFER PROGRAM, TRANSFER METHOD, AND TRANSFERRING DEVICE

CROSS-REFERENCE TO RELATED APPLICATION

This application is based upon and claims the benefit of priority of the prior Japanese Patent Application No. 2019-45263, filed on Mar. 12, 2019, the entire contents of which are incorporated herein by reference.

FIELD

The embodiment discussed herein is related to a computer-readable recording medium storing a transfer program, a transfer method, and a transferring device.

BACKGROUND

A system is used, in which multiple servers collect a large amount of data uploaded from an information processing terminal and accumulate the data in a distributed manner.

As a related technique, a technique has been proposed, which searches for a broker node, which is able to transfer meaning information transferred by a high-load broker node and is in a low-load state, and switches a node for containing a sensor node to the low-load broker node (refer to, for example, International Publication Pamphlet No. WO 2010/107105).

As another related technique, a technique has been proposed, in which a data provider transmits data to a destination on a broker unit, a data receiver specifies the destination as a receiver in a broker, and the broker relays the data transmitted toward the destination (refer, for example, Japanese Laid-open Patent Publication No. 2017-91454).

As another related technique, a technique has been proposed, which stores sensor information transmitted from a sensor, delivers the sensor information to another server coupled to a communication network, and stores sensor information delivered from another server (refer, for example, Japanese Laid-open Patent Publication No. 2015-232820).

In a system for accumulating data items in a distributed manner, when the capacity of a server that has received a data item uploaded exceeds an upper limit, the server transfers the data item to another server and causes the data item to be stored in the other server that is a transfer destination server. In this case, it is considered that the data item to be transferred, the transfer destination server, and a data group size at the time of the transfer are determined based on throughput. However, when the optimal data item to be transferred, the optimal transfer destination server, and the optimal data group size at the time of the transfer are to be determined to maximize the throughput, the amount of calculation increases, depending on the number of servers and the number of data items.

According to an aspect, an object is to suppress the amount of calculation to determine data to be transferred, a transfer destination device, and a data group size at the time of the transfer.

SUMMARY

According to an aspect of the embodiments, a transfer method is performed by an information processing apparatus. The method includes: selecting, based on a load status of the information processing apparatus, candidate transfer data that is among the received data and to be transferred to one or more other information processing apparatuses; selecting, based on load statuses of multiple other information processing apparatuses, one or more candidate transfer destination apparatuses among the multiple other information processing apparatuses as candidate transfer destinations of the data; determining, based on throughput between the information processing apparatus and the candidate transfer destination apparatuses, data to be transferred among the candidate transfer data, transfer destination apparatuses of the data to be transferred among the candidate transfer destination apparatuses, and the sizes of data groups including the data to be transferred; and transferring, to the transfer destination apparatuses determined for the determined data groups, the determined data to be transferred.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of load information and delay information;

FIG. 5 is a diagram illustrating an example of deadline setting information;

FIG. 6 is a diagram illustrating an example of information on an event data item;

FIG. 7 is a diagram illustrating an example of a list of candidate transfer data items;

FIG. 8 is a diagram illustrating an example of a list of candidate transfer destination servers;

FIG. 9 is a diagram illustrating an example of data transfer settings;

FIG. 10 is a diagram illustrating an example of high load state management information;

FIG. 11 is a diagram illustrating an example of a configuration of an event data item to be transmitted by an information processing terminal;

FIG. 12 is a diagram illustrating an example of a configuration of an event data item to be transferred to another server;

FIG. 13 is a diagram illustrating an example of a configuration of an event data item to be transmitted to an information processing terminal;

FIG. 14 is a diagram illustrating an example of load information to be transmitted between servers;

FIG. 15 is a diagram illustrating an example of transmission data for delay measurement;

FIG. 16 is a diagram illustrating an example of response data for delay measurement;

FIG. 30 is a diagram illustrating an example of a hardware configuration of each of the servers.

DESCRIPTION OF EMBODIMENTS

Figure 1:
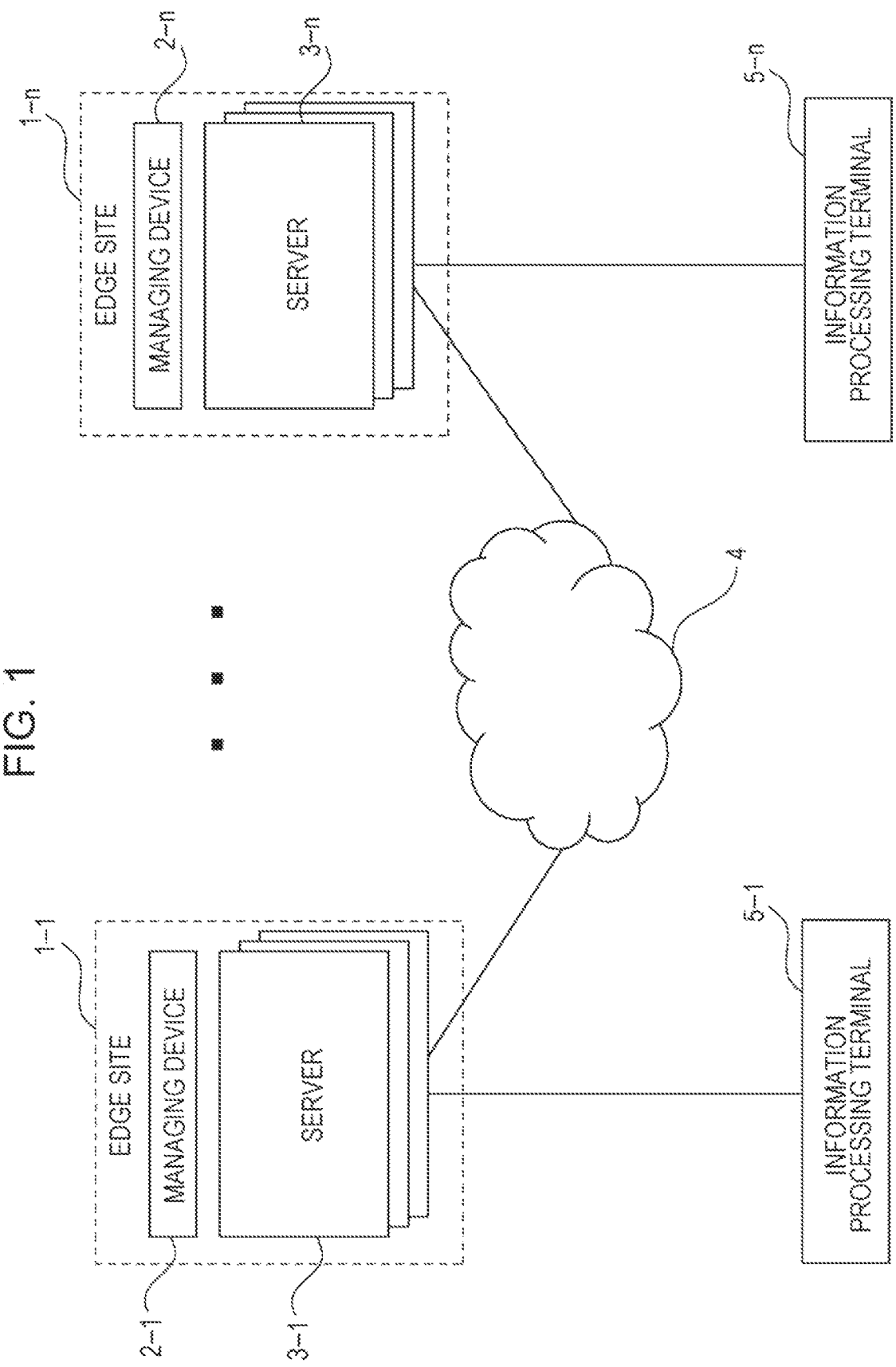
FIG. 1 is a diagram illustrating an example of an entire configuration of a system according to an embodiment.

Hereinafter, an embodiment is described with reference to the drawings. FIG. 1 is a diagram illustrating an example of a configuration of a system according to the embodiment. The system according to the embodiment includes multiple edge sites (edge sites 1-1 to 1-$n$), multiple information processing terminals (information processing terminals 5-1 to 5-$n$), and a network 4. When the edge sites 1-1 to 1-$n$ are not distinguished from each other, each of the edge sites 1-1 to 1-$n$ is hereinafter referred to as edge site 1. When the information processing terminals 5-1 to 5-$n$ are not distinguished from each other, each of the information processing terminals 5-1 to 5-$n$ is hereinafter referred to as information processing terminal 5.

The edge sites 1 include managing devices 2 and servers 3. The managing devices 2 are a general term for managing devices 2-1 to 2-$n$. The servers 3 are a general term for servers 3-1 to 3-$n$. Each of the edge sites 1 may include one or more servers 3. The embodiment assumes that each of the edge sites 1 includes a single server 3. The edge sites 1 are, for example, coupled to a base station to be used for mobile radio communication and collect traffic from the base station.

Each of the managing devices 2 manages a server 3 within an edge site 1 including the managing device 2. For example, the managing device 2 determines a server 3 that is included in the edge site 1 and is a storage destination of data transmitted (uploaded) by an information processing terminal 5. The managing device 2 manages reading progress of an information processing terminal 5 that acquires (downloads) data. The edge sites 1 may not include the managing devices 2, and the servers 3 may have functions of the managing devices 2.

Each of the servers 3 stores data transmitted by an information processing terminal 5. The server 3 transfers, based on a load status of the concerned server, data to another server 3, for example. The server 3 has, for example, a message broker function. The server 3 is an example of an information processing device that receives data. Alternatively, the server 3 is an example of another information processing device that is a transfer destination of data.

The network 4 is a communication network, such as a local area network (LAN) or a wide area network (WAN). The server 3 transmits and receives data to and from the other servers 3 via the network 4.

Each of the information processing terminals 5 transmits (uploads) various data to a server 3 included in an edge site 1. The information processing terminal 5 acquires (downloads) various data from the server 3 included in the edge site 1. The information processing terminal 5 is, for example, a mobile terminal, a personal computer, or the like.

In the example illustrated in FIG. 1, the information processing terminal 5-1 transmits data to the server 3-1 included in the edge site 1-1. Then, the server 3-1 transfers the data to the server 3-$n$ included in the edge site 1-$n$, and the server 3-$n$ stores the data. The information processing terminal 5-$n$ acquires the data from the server 3-$n$ to use the data.

For example, when a delay occurs in communication between the server 3-1 that is a data transfer source and the server 3-$n$ that is a data transfer destination, congestion may occur and transfer throughput (hereinafter merely referred to as throughput) may decrease. For example, when round-trip delay time (RU) between the server 3-1 and the server 3-$n$ is 1 ms, and the throughput is 800 kbps, the RU increases to 50 ms and the throughput decreases to 16 kbps. Especially, when an information processing terminal 5 receives an ACK in order to upload data and executes data delivery-guaranteed communication to delete, from the terminal, the data transmitted after the reception of the ACK, the occurrence of congestion and a decrease in the throughput are problems.

For example, it is considered that the server 3 improves the throughput by buffering the uploaded data and collectively transmitting the data (bulk transfer). However, as a result of the buffering, an additional delay may occur and a deadline may not be satisfied. The deadline is an upper limit (predetermined time period) of a time period from the time when an information processing terminal 5 transmits data to a server 3 to the time when another information processing terminal 5 receives the data. A deadline is set for each of data types in advance.

Thus, the server 3 determines a transfer data item, a server 3 that is a transfer destination of the data item, and a data group size at the time of the transfer so that requirements including a deadline are satisfied and that the throughput is improved. However, the amount of calculation to determine the transfer data item, the server 3 that is the transfer destination of the data item, and the data group size at the time of the transfer increases, depending on the number of servers 3 and the number of data items.

Therefore, before the calculation of the throughput, the server 3 selects a candidate data item to be transferred to another server 3 and a candidate transfer destination server that is a candidate transfer destination. Then, the server 3 uses only the selected candidate data item and the selected candidate transfer destination server for the calculation, thereby suppressing the amount of calculation.

Figure 2:
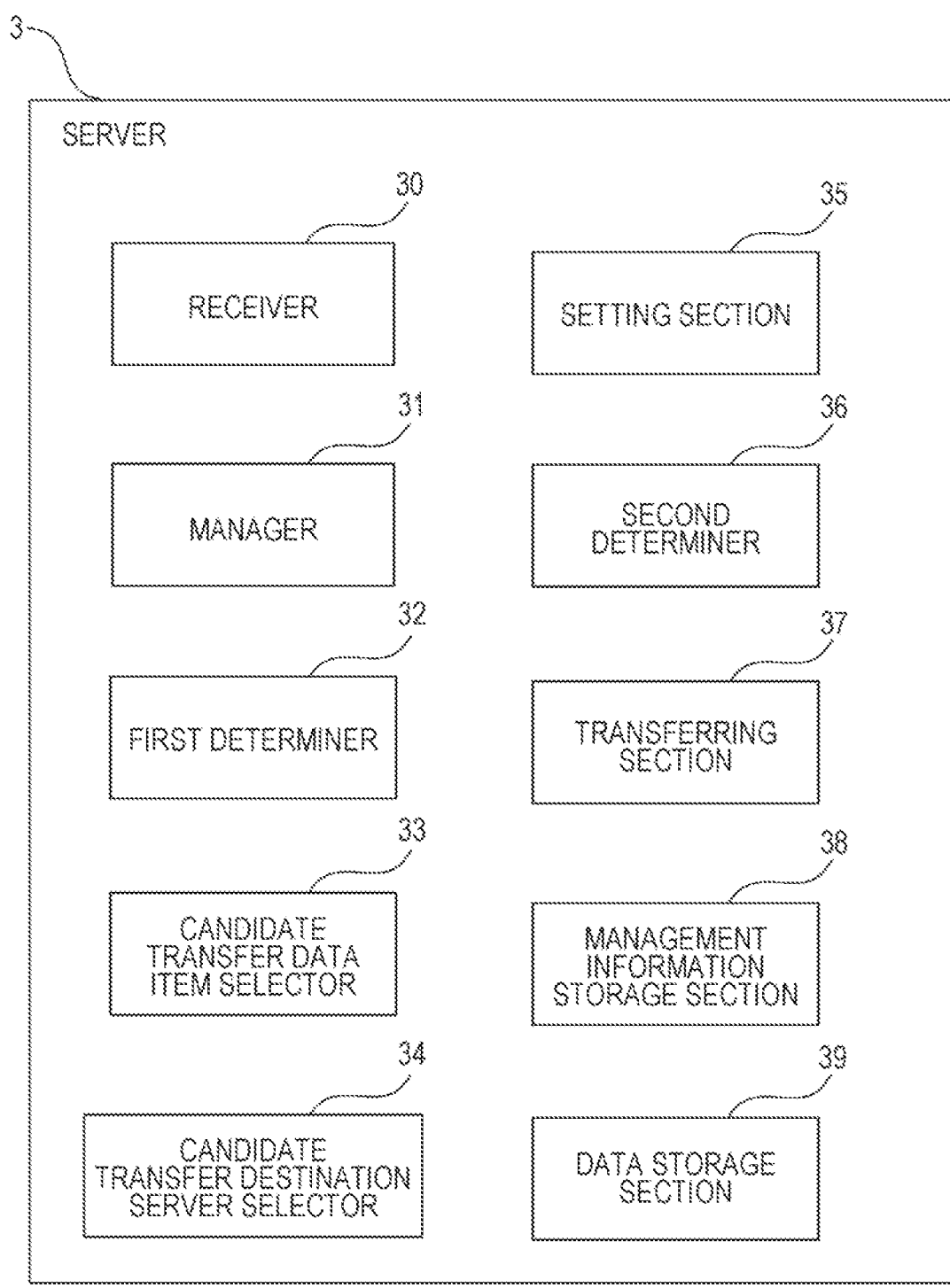
FIG. 2 is a diagram illustrating an example of a functional configuration of each of servers.

FIG. 2 is a diagram illustrating an example of a functional configuration of each of the servers 3. The server 3 includes a receiver 30, a manager 31, a first determiner 32, a candidate transfer data item selector 33, a candidate transfer destination server selector 34, a setting section 35, a second determiner 36, a transferring section 37, a manage information storage section 38, and a data storage section 39.

The receiver 30 receives an event data item from an information processing terminal 5. It is assumed that the event data item is the minimum unit of data to be used in the embodiment. The event data item is hereinafter merely referred to as data in some cases.

The manager 31 manages load information of the servers 3 including the concerned server and network delay information of the servers 3 including the concerned server 3. The manager 31 measures network delays from the concerned server to the other servers 3 and causes the network delays to be stored in the manage information storage section 38. The manager 31 collects the load information of the servers 3 including the concerned server and causes the load information to be stored in the manage information storage section 38.

The first determiner 32 determines whether a consumed capacity of a memory that is included in the concerned server and configured to temporarily store data, an event data item input frequency, and the amount of data input and output to and from a storage device included in the concerned server and configured to store data exceed thresholds after a predetermined time period. In an example of the embodiment, the amount of data input and output to and from the storage device is disk I/O indicating the amount of data input and output to and from a hard disk per unit of time.

The candidate transfer data item selector 33 references the flags set by the first determiner 32 and selects a candidate transfer data item for each of data types based on a load status of the server 3 (concerned server) that has received data. The candidate transfer data item is among the received data and is candidate data to be transferred to another server 3. The load status used by the candidate transfer data item selector 33 to select the candidate transfer data items indicates a consumed capacity of the memory that is included in the concerned server and configured to temporarily store data, the event data item input frequency of the concerned server, and the amount of data input and output to and from the storage device included in the concerned server and configured to store data.

The candidate transfer destination server selector 34 selects, based on load statuses of the other servers 3, candidate transfer destination servers that are candidate transfer destinations of data among the other servers 3. The candidate transfer destination server selector 34 is an example of a transfer destination device selector. The load statuses used by the candidate transfer destination server selector 34 to select the candidate transfer destination servers indicate consumed capacities of memories included in the other servers 3 and configured to temporarily store data, event data item input frequencies of the other servers 3, and amounts of data input and output to and from storage devices included in the other servers 3 and configured to store data.

The setting section 35 acquires loads (for example, a current consumed capacity of the memory, the disk I/O, and an event data item input frequency) of the server 3 (concerned server) that has received data. The setting section 35 sets flags (high load flags) indicating whether the loads are high or not. When a load of the concerned server is equal to or lower than a predetermined criterion, the setting section 35 deletes a set detail satisfying a predetermined requirement from data transfer settings that are settings for transferring data to the other servers 3.

The second determiner 36 determines data to be transferred among candidate transfer data items based on throughput between the concerned server and the candidate transfer destination servers. The second determiner 36 determines, based on the throughput, transfer destination servers that are among the candidate transfer destination servers and to which the determined data is to be transferred. The second determiner 36 determines, based on the throughput, the size of each of data groups including the data to be transferred. Each of the data groups is a group of data including multiple event data items (or the data to be transferred). Multiple event data items are included in each of the data groups, which are transferred to the transfer destination servers, respectively. The second determiner 36 determines the number of event data items of one data group, thereby determining the size of the data group, for example. The second determiner 36 records, as data transfer settings, identification information indicating the determined data to be transferred, identification information indicating the transfer destination servers, and the size of each of the data groups. Identification information indicating data to be transferred is set for each of data types, for example.

A process to be executed by the second determiner 36 is described below in detail. The second determiner 36 determines whether a candidate transfer data item and a candidate transfer destination server satisfy the following Inequalities (1) to (3). In Inequalities (1) to (3), W is the number of event data items included in a data group, and $D_{p_i}$ is a deadline (seconds) of an event data item $P_i$ (i is an identifier of the event data item). $\lambda^j_{p_i}$ is a frequency (the number of event data items/second) with which the event data item $P_i$ is input to a receiving server j that receives data, $d^{-k}_w$ is an average writing delay (seconds) of a transfer destination server k, and $d^{-k}_r$ is an average reading delay (seconds) of the transfer destination server k. $l^{jk}$ is round-trip delay time (RTT) (seconds) between the receiving server j and the transfer destination server k, and $b^{jk}$ is a bandwidth (bps) between the receiving server j and the transfer destination server k. $S_{p_i}$ is the size (bytes) of the event data item $P_i$, and $M^k$ is an available capacity (bytes) of a buffer (memory) of the transfer destination server k. When multiple servers 3 exist in an edge site 1, each of the parameters may be an average value of parameters related to the servers 3 of the edge site 1.

$$1 \leq W < D_{p_i} \times \lambda^j_{p_i} \tag{1}$$

$$D_{p_i} \geq d_w^{-k} + d_r^{-k} + \max\left(\frac{l^{jk}}{2}, \frac{S_{p_i} \times W}{b^{jk}}\right) + \frac{W}{\lambda^j_{p_i}} \tag{2}$$

$$S_{p_i} \times W \leq M^k \tag{3}$$

In Inequality (2), $\max(l^{jk}/2, S_{p_i} \times W/b^{jk})$ indicates the maximum value among $(l^{jk}/2)$ and $(S_{p_i} \times W/b^{jk})$. When the foregoing Inequality (2) is satisfied, a time period from the time when an information processing terminal 5 transmits data to a server 3 to the time when another information processing terminal 5 receives the data is equal to or shorter than a deadline. For example, the second determiner 36 determines data to be transferred, a transfer destination device to which the data is to be transferred, and the size of a data group including the data to be transferred so that the time period from the information processing terminal 5 transmits the data to the server 3 to the time when the other information processing terminal 5 receives the data is equal to or shorter than the deadline. Thus, the server 3 may inhibit the time period to the time when the information processing terminal 5 receives the data from being longer than the deadline.

The second determiner 36 determines, for each of types of event data items, a transfer destination server 3 and a data group size at the time of transfer, which satisfy the foregoing Inequalities (1) to (3) and cause the maximum of the throughput TP that is calculated according to the following Equation (4) and is at the time of the transfer. The second determiner 36 determines the size of a data group by determining the number W of event data items included in the data group. When a combination of a transfer destination server 3 and a data group size at the time of the transfer, which satisfies the foregoing Inequalities (1) to (3), does not exist for data of a certain type, the second determiner 36 determines that the data of the certain type is to be divided into data groups and that the divided data groups are to be transferred to multiple transfer destination servers 3. When the second determiner 36 divides the data of the certain type into the data groups and transfers the divided data groups to the multiple transfer destination servers 3, and a combination of a transfer destination server 3 and a data group size at the time of the transfer, which satisfies the foregoing Inequalities (1) to (3), does not exist, the second determiner 36 determines that the data of the certain type is not to be transferred.

$$TP = \frac{S_{P_i} \times W}{l^{jk}/2} \quad (4)$$

The amount O of calculation by the second determiner 36 for the foregoing Inequalities (1) to (3) and the foregoing Equation (4) is expressed according to the following Equation (5). $W_{max}$ is the maximum number of event data items of a single data type, $H^j$ is the number of types of candidate transfer data items, K is the number of other servers 3, n is the number of data groups into which data is divided, and $n_{max}$ is the maximum number of data groups into which data is divided.

$$O = W_{max} \times H^j \times \sum_{\pi=1}^{\pi max} {}_K C_\pi \quad (5)$$

Since the second determiner 36 determines, for each of types of candidate transfer data items, a transfer destination server 3 and a data group size at the time of transfer, the amount O of calculation for the foregoing Inequalities (1) to (3) and Equation (4) depends on the number of types of candidate transfer data items, as expressed by Equation (5). The amount O of calculation also depends on the number K of other servers 3. For example, since the candidate transfer data item selector 33 narrows down types of data to be transferred and the candidate transfer destination server selector 34 narrows down other servers 3 that may be transfer destinations, the amount of calculation may be suppressed.

The transferring section 37 transfers data groups including data selected by the candidate transfer data item selector 33 to respective transfer destination servers. The sizes of the data groups at the time of the transfer are determined by the second determiner 36.

The manage information storage section 38 stores various management information, such as load information collected by the manager 31, delay information collected by the manager 31, and transfer settings determined by the second determiner 36.

The data storage section 39 stores, for each of data types, an event data item received from an information processing terminal 5 and event data items transferred from the other servers 3.

Figure 3:
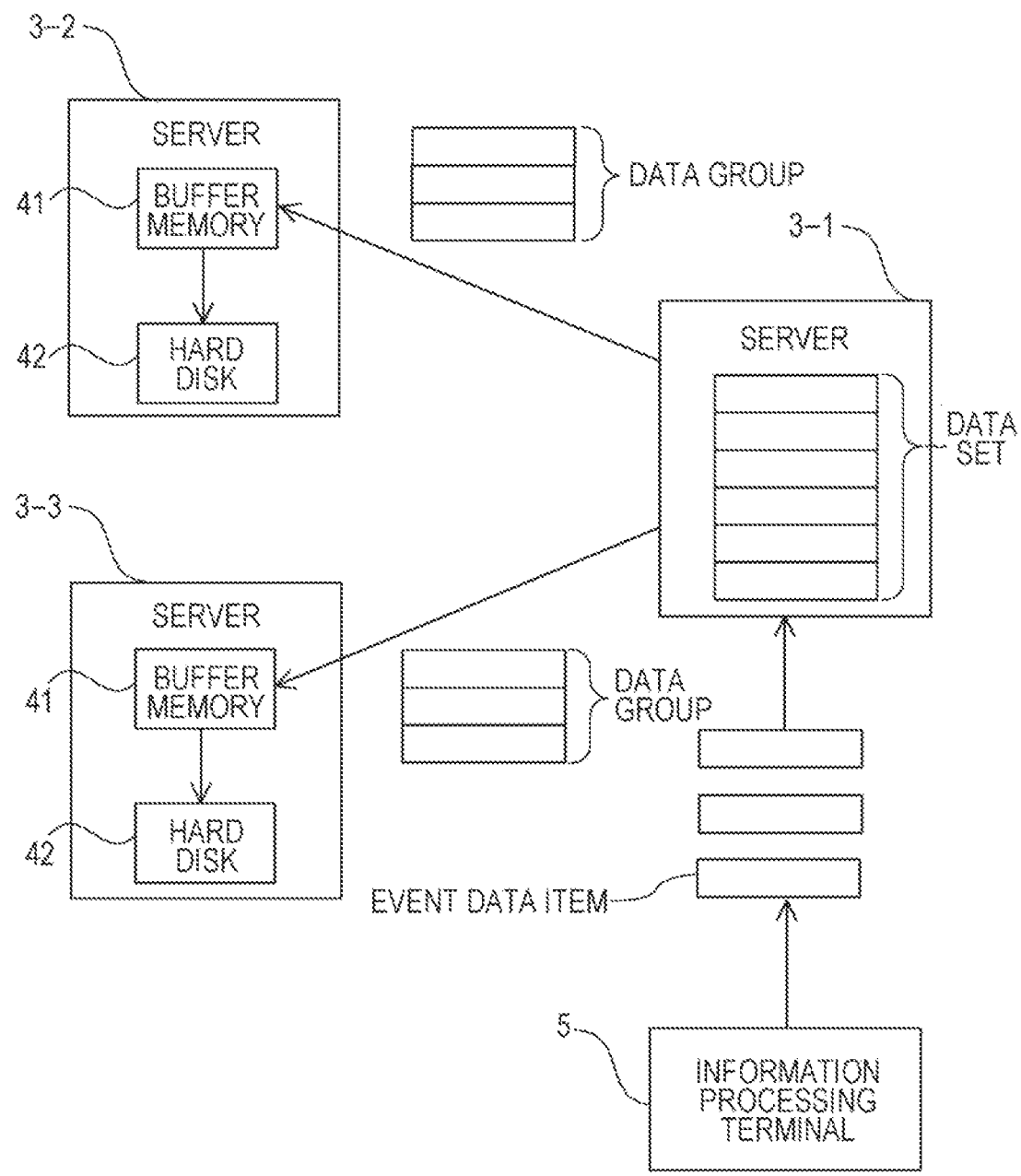
FIG. 3 is a diagram illustrating an overview of data transfer.

FIG. 3 is a diagram illustrating an overview of data transfer. For example, an information processing terminal 5 uploads multiple event data items to the server 3-1. The server 3-1 receives the event data items and manages the event data items as a data set for each of data types. When the server 3-1 determines, based on a load status of the concerned server, that it is difficult to store the received event data items in the concerned server, the server 3-1 transfers the received event data items to other servers 3.

The server 3-1 transfers data groups including the received event data items to the respective other servers 3. When it is difficult to transfer a data set corresponding to a single data type to a single server 3, the server 3-1 divides the data set and transfers the divided data set to the multiple other servers 3. In the example illustrated in FIG. 3, the server 3-1 divides the data set into data groups and transfers the divided data groups to the servers 3-2 and 3-3.

The servers 3-2 and 3-3 receive the data groups and temporarily store the data groups in buffer memories 41. After that, the servers 3-2 and 3-3 write the data groups to hard disks 42. Each of the hard disks 42 is an example of the data storage section 39.

FIG. 4 is a diagram illustrating an example of the load information and the delay information. The manager 31 generates load information (illustrated in FIG. 4) on the concerned server and delay information (illustrated in FIG. 4) on the concerned server and causes the load information and the delay information to be stored in the manage information storage section 38. The manager 31 periodically updates the load information and the delay information. The load information and the delay information include an identification (ID) identifying the server 3, an address (IP address), a port to be used for transfer, and central processing unit (CPU) utilization. The load information and the delay information also include a consumed capacity of a buffer (memory), a total capacity of the buffer (memory), a consumed capacity of a disk, a total capacity of the disk, disk input and output (I/O), and the maximum disk I/O. The load information and the delay information also include an event data item input frequency, the maximum event data item input frequency, a network delay, a bandwidth, an average writing delay, and an average reading delay.

The ID may be added to a message broker included in the server 3. The event data item input frequency is the number of event data items input to the server 3 per second. The maximum event data item input frequency is a value depending on processing performance of a CPU of the server 3. The disk I/O is an example of the amount of data input and output to a storage device (data storage section 39) included in the server 3 and configured to store event data items. The network delay corresponds to $l^{jk}$ (RTT between the concerned server 3 and another server 3) indicated in the foregoing Inequality (2) and Equality (4). The bandwidth corresponds to $b^{jk}$ (bandwidth between the concerned server 3 and the other server 3) indicated in the foregoing Inequality (2). When multiple other servers 3 exist, a network delay and a bandwidth, which are illustrated in FIG. 4, are recorded for each of the other servers 3. The average writing delay corresponds to $d^{-k}_w$ indicated in Inequality (2), while the average reading delay corresponds to $d^{-k}_r$ indicated in Inequality (2).

FIG. 5 is a diagram illustrating an example of deadline setting information. As illustrated in FIG. 5, a deadline is set for each of the data types in advance. The deadline is an upper limit of a time period from the time when an information processing terminal 5 transmits data to a server 3 to the time when another information processing terminal 5 receives the data.

FIG. 6 is a diagram illustrating an example of information on an event data item. As illustrated in FIG. 6, event data information includes a data type, an event data item input frequency, the size of the event data item, and a deadline. For example, the information illustrated in FIG. 6 indicates, for each of data types, an event data item input frequency, the size of an event data item, and a deadline. The manager 31 updates the information illustrated in FIG. 6 based on the received event data item.

FIG. 7 is a diagram illustrating an example of a list of candidate transfer data items. As illustrated in FIG. 7, data types are recorded in a list of candidate transfer data items. When the candidate transfer data item selector 33 selects a candidate data item to be transferred to another server 3, the candidate transfer data item selector 33 records the type of the selected data item.

FIG. 8 is a diagram illustrating an example of a list of candidate transfer destination servers. As illustrated in FIG. 8, the list of candidate transfer destination servers includes IDs of servers 3 selected as candidate transfer destinations. When the candidate transfer destination server selector 34 selects a candidate data transfer destination server 3, the candidate transfer destination server selector 34 records the ID of the selected server 3.

FIG. 9 is a diagram illustrating an example of data transfer settings. In the data transfer settings, types of data to be transferred, IDs of data transfer destination servers 3, ratios of sizes of data groups when received event data items are divided and transferred to multiple servers 3 are associated and recorded. The ratios are set so that the total of ratios for each of the data types is 10. In the data transfer settings, the number of event data items of each of data groups to be transferred is recorded. The number of event data items of each of the data groups corresponds to the size of the data group. The transfer settings illustrated in FIG. 9 are recorded by the second determiner 36.

FIG. 10 is a diagram illustrating an example of high load state management information. The high load state management information includes information indicating whether a memory is highly loaded, whether event data item input is highly loaded, and whether disk I/O is highly loaded. For example, when the first determiner 32 that a current load (memory load, event data item input load, or disk I/O load) is high after a predetermined time period, the first determiner 32 sets True. When the first determiner 32 determines the current load is not high, the first determiner 32 sets False. A method of the determination by the first determiner 32 is described later in detail. The information illustrated in FIGS. 4 to 10 is stored in the manage information storage section 38.

FIG. 11 is a diagram illustrating an example of a configuration of an event data item to be transmitted by an information processing terminal 5. An event data item illustrated in FIG. 11 includes an IP address and port number of a data generating client (information processing terminal 5) that is a source of the event data item, an IP address and port number of a server 3 that is a destination of the event data item, a source ID (of the data generating client), a data type, and a payload.

FIG. 12 is a diagram illustrating an example of a configuration of an event data item to be transferred to another server 3. FIG. 12 illustrates, for example, a configuration of an event data item to be transmitted by a server 3, which has received data, to another server 3. The event data item illustrated in FIG. 12 includes an IP address and port number of the server 3 that is a source of the event data item, an IP address and port number of the other server 3 that is a destination (transfer destination), a source ID (of a data generating client), a data type, and a payload.

FIG. 13 is a diagram illustrating an example of a configuration of an event data item to be transmitted to an information processing terminal 5. FIG. 13 illustrates, for example, a configuration of an event data item to be transmitted to the information processing terminal 5 of a client where a server 3 uses data. The event data item illustrated in FIG. 13 includes an IP address and port number of a server 3 that is a source of the event data item, an IP address and port number of a data using client (information processing terminal 5) that is a destination of the event data item, a source ID (of a data generating client), a data type, and a payload.

FIG. 14 illustrates an example of load information to be transmitted between servers. A server 3 transmits load information (illustrated in FIG. 14) of the concerned server to another server 3. Therefore, the servers 3 share the load information. The load information includes an IP address and port number of the server 3 that is a source of the load information, an IP address and port number of a data using client (information processing terminal 5) that is a destination of the load information, a source ID (of the server 3 that has generated the load information), and a CPU load (CPU utilization). The load information also includes a buffer (memory) load (a consumed capacity of a buffer (memory) and the total capacity of the buffer (memory)), a disk capacity load (a consumed capacity of a disk and the total capacity of the disk), disk I/O load (disk I/O and the maximum disk I/O), and data input load (data input frequency and the maximum data input frequency).

FIG. 15 is a diagram illustrating an example of transmission data for delay measurement. The transmission data for the delay measurement includes an IP address of a data source server 3, an IP address of a destination server 3 (server to be measured), and transmission time (timestamp). The manager 31 transmits the data illustrated in the example of FIG. 15 to another server 3 to measure a network delay between the concerned server 3 and the other server 3.

FIG. 16 is a diagram illustrating an example of response data for delay measurement. The response data for the delay measurement includes an IP address of a data source server 3 (server to be measured), a destination server 3 (source of the transmission data for the delay measurement), and transmission time (timestamp) when the source server 3 has transmitted the transmission data. The manager 31 transmits the response data illustrated in the example of FIG. 16 when the data (illustrated in FIG. 15) for the delay measurement is transmitted by another server 3. The manager 31 measures network delay time based on the difference between the transmission time indicated in the transmission data illustrated in FIG. 15 and time when the response data illustrated in FIG. 16 is received.

Figure 17:
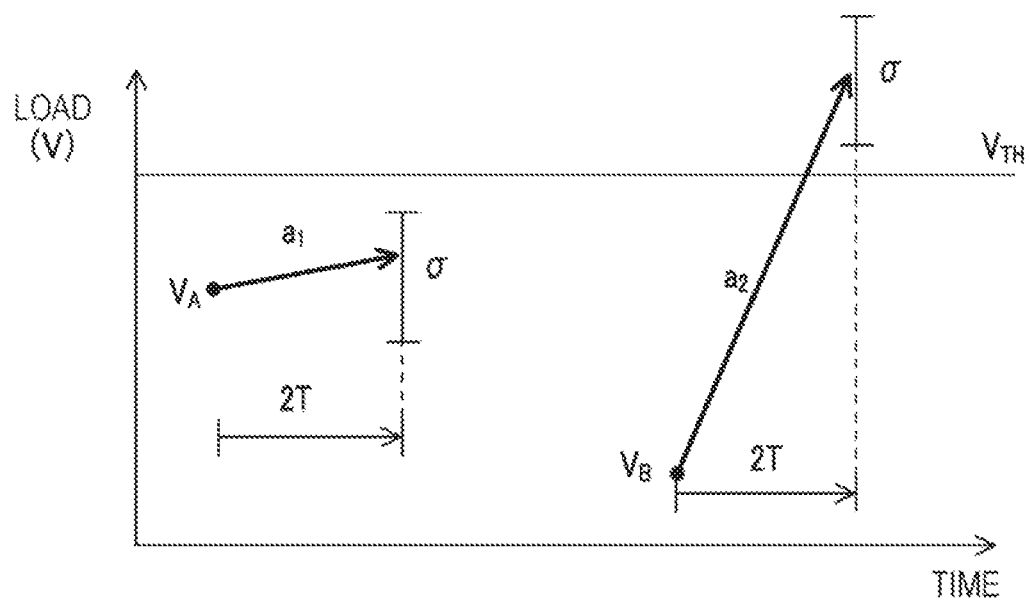
FIG. 17 is a diagram illustrating an example of a high load determination method.

FIG. 17 is a diagram illustrating an example of a high load determination method. A load illustrated in FIG. 17 is a consumed capacity of a memory, an event data item input frequency, or disk I/O. T is the frequency with which the determination is made by the first determiner 32, σ is a standard deviation, $a(a_1, a_z)$ is the amount of a change in the load per unit of time, V is the load, and $V_{TH}$ is a threshold to be used to determine whether the load is high.

When the load at a certain time point is V, and, for example, V+2aT+σ is larger than $V_{TH}$, the first determiner 32 determines that the load is likely to be high. In the example illustrated in FIG. 17, the load is $V_A$, $V_A+2a_1T+σ$ is smaller than $V_{TH}$, and the first determiner 32 determines that the load is unlikely to be high. When the load is $V_B$, $V_B+2a_2T+σ$ is larger than $V_{TH}$, and the first determiner 32 determines that the load is likely to be high.

Figure 18:
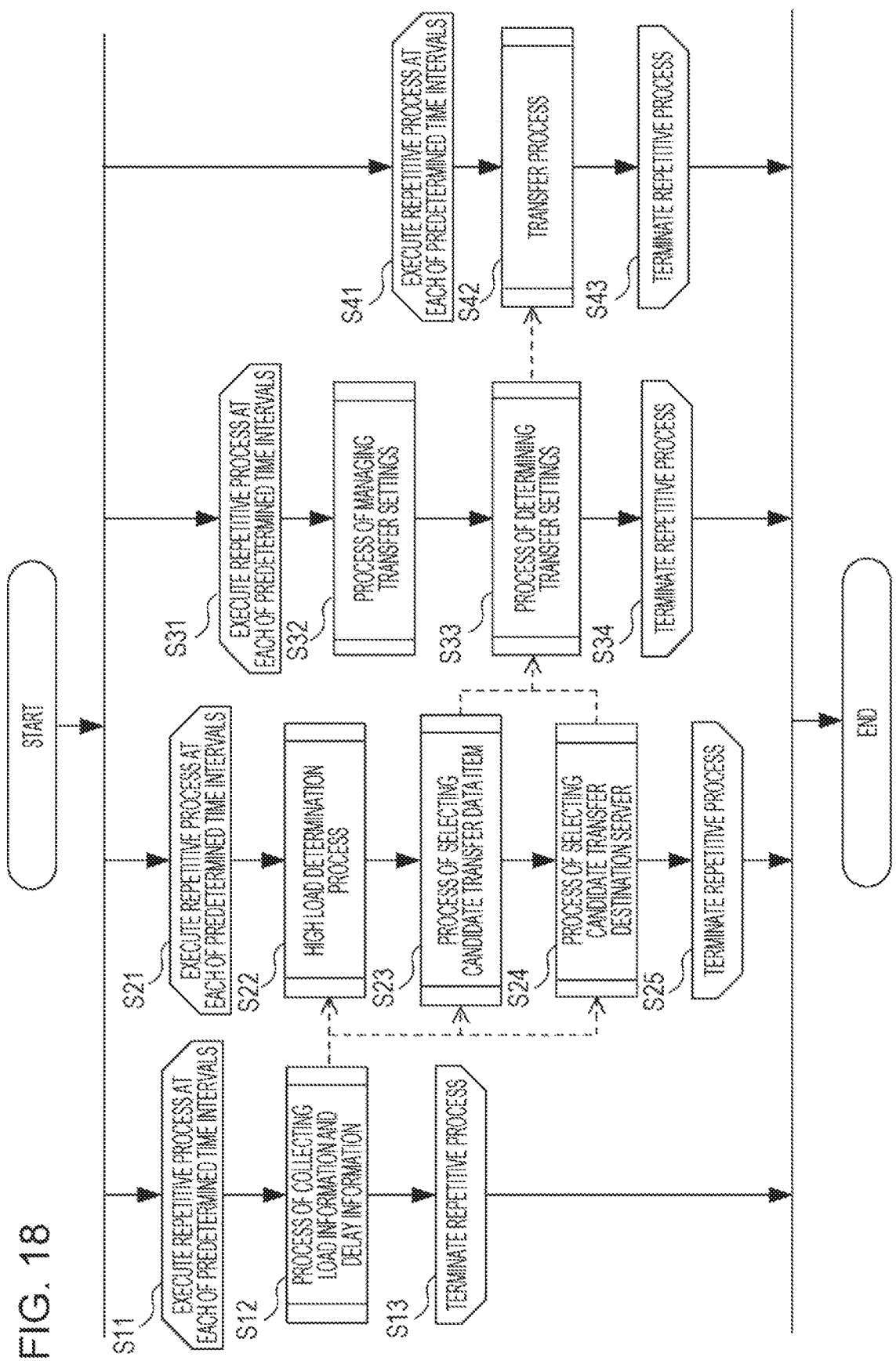
FIG. 18 is a flowchart illustrating an example of a process to be executed by a server according to the embodiment.

FIG. 18 is a flowchart illustrating an example of a process to be executed by a server 3 according to the embodiment. The server 3 executes, in parallel, steps S11 to S13, steps S21 to S25, steps S31 to S34, and step S41, which are illustrated in FIG. 18.

The server 3 starts a repetitive process, which is executed at each of predetermined time intervals (in step S11). The manager 31 executes a process of collecting the load information and the delay information (in step S12). The server 3 terminates the repetitive process in accordance with a stop instruction from an administrator or the like (in step S13).

The server 3 starts a repetitive process, which is executed at each of predetermined time intervals (in step S21). The first determiner 32 executes a high load determination process based on the load information collected in step S12 and the delay information collected in step S12 (in step S22). The candidate transfer data item selector 33 executes a process of selecting a candidate transfer data item based on the load information, collected in step S12, of the concerned server and the delay information, collected in step S12, of the concerned server (in step S23). The candidate transfer destination server selector 34 executes a process of selecting a candidate transfer destination server based on the load information, collected in step S12, of the other servers 3 and the delay information, collected in step S12, of the other servers 3 (in step S24). The server 3 terminates the repetitive process in accordance with a stop instruction from the administrator or the like (in step S25).

The server 3 starts a repetitive process, which is executed at each of predetermined time intervals (in step S31). The setting section 35 executes a process of managing transfer settings (in step S32). The second determiner 36 uses the candidate transfer data item selected in step S23 and the candidate transfer destination server selected in step S24 to execute a process of determining transfer settings (in step S33). The transfer settings include data to be transferred, a transfer destination server, and the size of a data group. The server 3 terminates the repetitive process in accordance with a stop instruction from the administrator or the like (in step S34).

The server 3 starts a repetitive process, which is executed at each of predetermined time intervals (in step S41). The transferring section 37 executes a transfer process based on the transfer settings determined in step S33 (in step S42). The server 3 terminates the repetitive process in accordance with a stop instruction from the administrator or the like (in step S43).

Details of the processes of steps S12, S22, S23, S24, S32, S33, and S42 are described later. The time intervals (predetermined time intervals) at which steps S11 to S13, steps S21 to S25, steps S31 to S34, and S41 are executed may be equal to each other or may vary.

Figure 19:
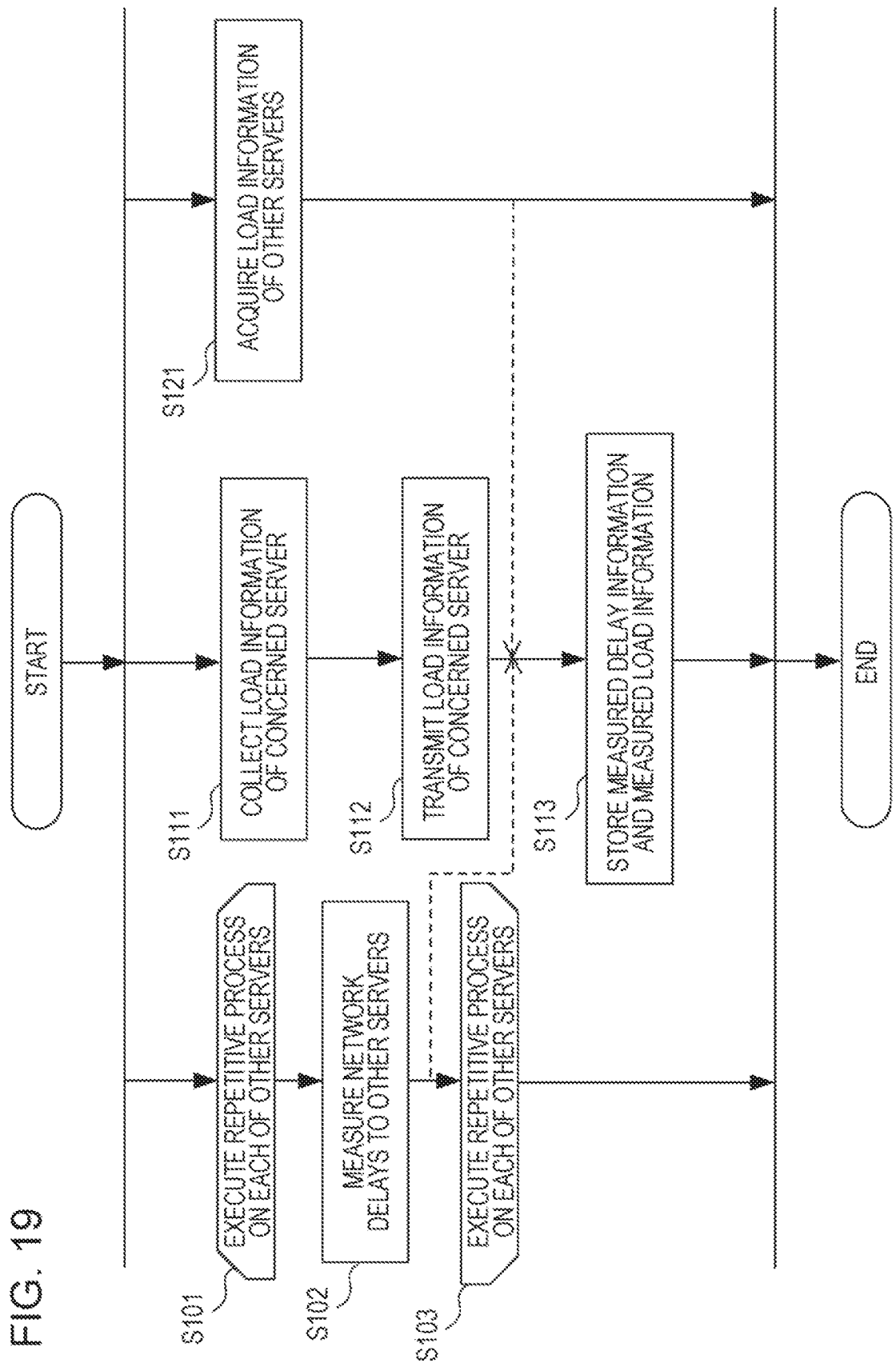
FIG. 19 is a flowchart illustrating an example of a process of collecting load information and delay information.

FIG. 19 is a flowchart illustrating an example of the process of collecting the load information and the delay information. Processes illustrated in FIG. 19 are details of step S12 illustrated in FIG. 18. The manager 31 executes, in parallel, processes of steps S101 to S103, processes of steps S111 to S113, and a process of step S121. Steps S101 to S103, S111 to S113, and S121, which are illustrated in FIG. 19.

The manager 31 starts executing a repetitive process on each of the other servers 3 for network delays (in step S101). The manager 31 measures the network delays between the concerned server 3 and the other servers 3 (in step S102). For example, the manager 31 transmits the data illustrated in FIG. 15 to another server 3 and receives the response data illustrated in FIG. 16 from the other server 3. Then, the manager 31 measures network delay time based on the difference between the time when the manager 31 transmits the transmission data illustrated in FIG. 15 and the time when the manager 31 receives the response data illustrated in FIG. 16. The manager 31 causes the measured network delay time to be stored in the manage information storage section 38. When the manager 31 measures the network delays for all the other servers 3, the manager 31 terminates the repetitive process (in step S103).

The manager 31 collects the load information (refer to, for example, FIG. 14) of the concerned server (in step S111). The manager 31 transmits the load information collected in step S111 to the other servers 3 (in step S112). The manager 31 acquires the load information of the other servers 3 (in step S121). The manager 31 causes the delay information obtained in step S102 and the load information obtained in steps S111 and S121 to be stored in the manage information storage section 38 (in step S113).

Figure 20:
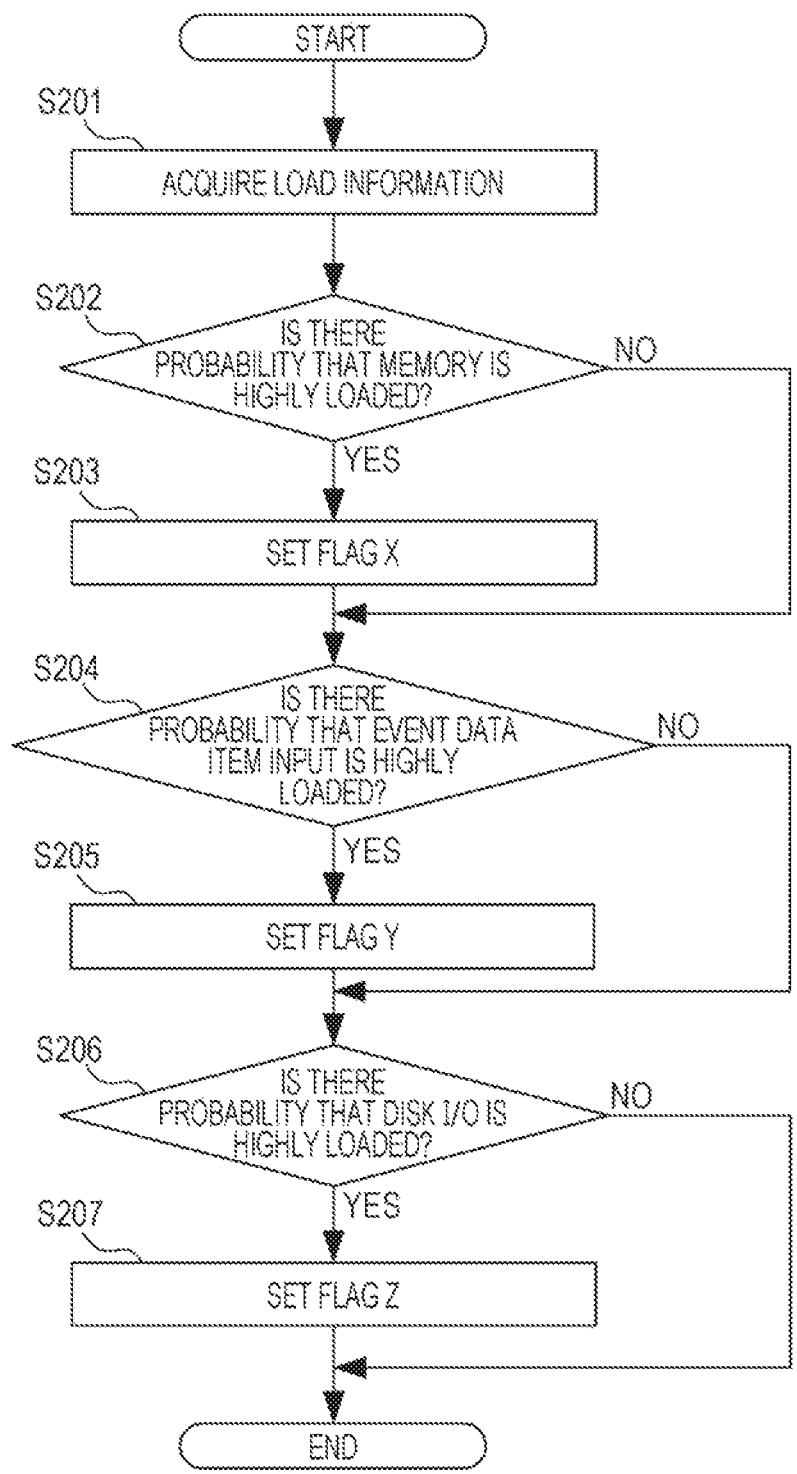
FIG. 20 is a flowchart illustrating an example of a high load determination process.

FIG. 20 is a flowchart illustrating an example of the high load determination process. Processes illustrated in FIG. 20 are details of step S22 illustrated in FIG. 18. The first determiner 32 acquires, from the manage information storage section 38, the load information of the concerned server and the load information of all the other servers 3 (in step S201). The load information acquired by the first determiner 32 is the information collected in steps S111 and S121 illustrated in FIG. 19.

The first determiner 32 determines whether there is a probability that the memory is highly loaded after a predetermined time period (in step S202). For example, the first determiner 32 uses the method described with reference to FIG. 17 to determine whether a consumed capacity of the memory exceeds a memory threshold after the predetermined time period. When the answer to the determination of step S202 is YES, the first determiner 32 sets a flag X (in step S203).

When the answer to the determination of step S202 is NO or after the process of step S203, the first determiner 32 determines whether there is a probability that the event data item input is highly loaded after a predetermined time period (in step S204). For example, the first determiner 32 uses the method described with reference to FIG. 17 to determine whether the event data item input frequency exceeds an event data item input frequency threshold after the predetermined time period. When the answer to the determination of step S204 is YES, the first determiner 32 sets a flag Y (in step S205).

When the answer to the determination of step S204 is NO or after the process of step S205, the first determiner 32 determines whether there is a probability that the disk I/O is highly loaded after a predetermined time period (in step S206). For example, the first determiner 32 uses the method described with reference to FIG. 17 to determine whether the disk I/O exceeds a disk I/O threshold after the predetermined time period. When the answer to the determination of step S206 is YES, the first determiner 32 sets a flag Z (in step S207). The server 3 executes the processes of steps S202 to S207 on the concerned server and all the other servers 3.

Figure 21:
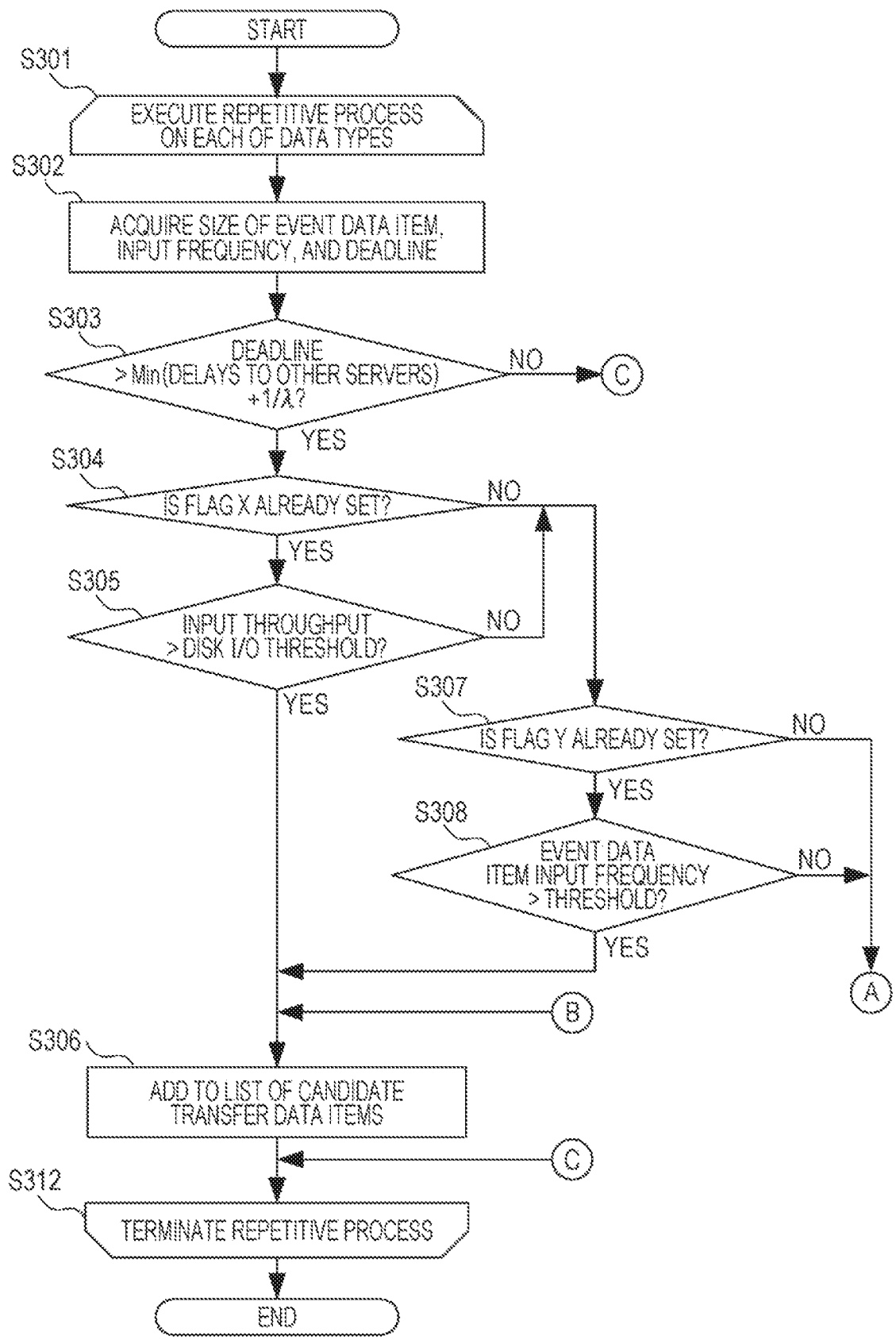
FIG. 21 is a first flowchart illustrating an example of a process of selecting a candidate transfer data item.
Figure 22:
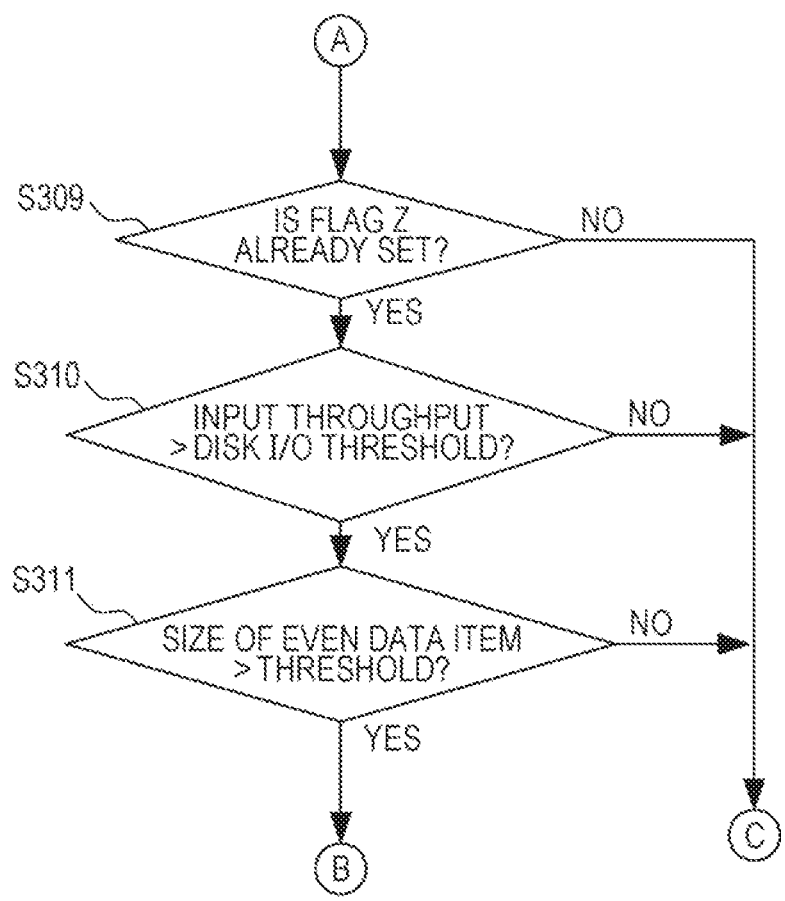
FIG. 22 is a second flowchart illustrating the example of the process of selecting a candidate transfer data item.

FIGS. 21 and 22 are flowcharts illustrating an example of the process of selecting a candidate transfer data item. Processes illustrated in FIGS. 21 and 22 are details of step S23 illustrated in FIG. 18.

The candidate transfer data item selector 33 starts executing a repetitive process on each of data types (in step S301). The candidate transfer data item selector 33 acquires the size of an event data item, an event data item input frequency, and a deadline from event data information (refer to, for example, FIG. 6) stored in the manage information storage section 38 (in step S302). The candidate transfer data item selector 33 calculates the following Inequality (6) to determine whether the deadline of the event data item is satisfied (in step S303). In Inequality (6), Min(delays to the other servers 3) is the minimum value among the delays, measured in step S102 illustrated in FIG. 19, up to the multiple other servers 3. $\lambda$ is the event data item input frequency, and $1/\lambda$ is an interval between time points when an event data item is input.

$$\text{The deadline of the event data item} > \text{Min(delays to the other servers 3)} + 1/\lambda \quad (6)$$

When the deadline of the event data item satisfies the Inequality (6) (YES in step S303), the candidate transfer data item selector 33 determines whether the flag X is already set in the concerned server (in step S304). As described above, when the flag X is already set, the flag X indicates that the first determiner 32 has determined that a consumed capacity of the memory is likely to exceed the memory threshold after a predetermined time period. The memory is used as a buffer upon the input of data. Thus, when the flag X is already set, the flag X indicates that an available buffer capacity is not sufficient to write data to the disk (data storage section 39). Therefore, when the flag X is already set (YES in step S304), the candidate transfer data item selector 33 determines whether input throughput is larger than the disk I/O threshold (in step S305). The input throughput used in step S305 is the size of the event data item×the event data item input frequency. When the answer to the determination of step S305 is YES, the candidate transfer data item selector 33 adds a data type to be processed to the list (refer to, for example, FIG. 7) of candidate transfer data items (in step S306).

When the answer to the determination of step S304 or S305 is NO, the candidate transfer data item selector 33 determines whether the flag Y is already set in the concerned server (in step S307). As described above, when the flag Y is already set, the flag Y indicates that the first determiner 32 has determined that the event data item input frequency is likely to exceed the event data item input frequency threshold. Therefore, when the flag Y is already set (YES in step S307), the candidate transfer data item selector 33 determines whether the event data item input frequency is larger than the event data item input frequency threshold (in step S308). When the answer to the determination of step S308 is YES, the candidate transfer data item selector 33 adds the data type to be processed to the list of candidate transfer data items (in step S306).

When the answer to the determination of step S307 or S308 is NO, the candidate transfer data item selector 33 determines whether the flag Z is already set in the concerned server (in step S309 illustrated in FIG. 22). As described above, when the flag Z is already set, the flag Z indicates that the first determiner 32 has determined that the disk I/O is likely to exceed the disk I/O threshold after a predetermined time period. Therefore, when the flag Z is already set (YES in step S309), the candidate transfer data item selector 33 determines whether the input throughput is larger than the disk I/O threshold (in step S310). When the answer to the determination of step S310 is YES, the candidate transfer data item selector 33 determines whether the size of the event data item is larger than an event data item size threshold (in step S311). When the answer to the determination of step S311 is YES, the candidate transfer data item selector 33 adds the data type to be processed to the list of candidate transfer data items (in step S306 illustrated in FIG. 21). When the answer to the determination of step S309, S310, or S311 is NO, the candidate transfer data item selector 33 terminates the process executed on the data type to be processed. When the candidate transfer data item selector 33 executes the processes of steps S301 to S311 on all the data types, the candidate transfer data item selector 33 terminates the repetitive process (in step S312 illustrated in FIG. 21).

Figure 23:
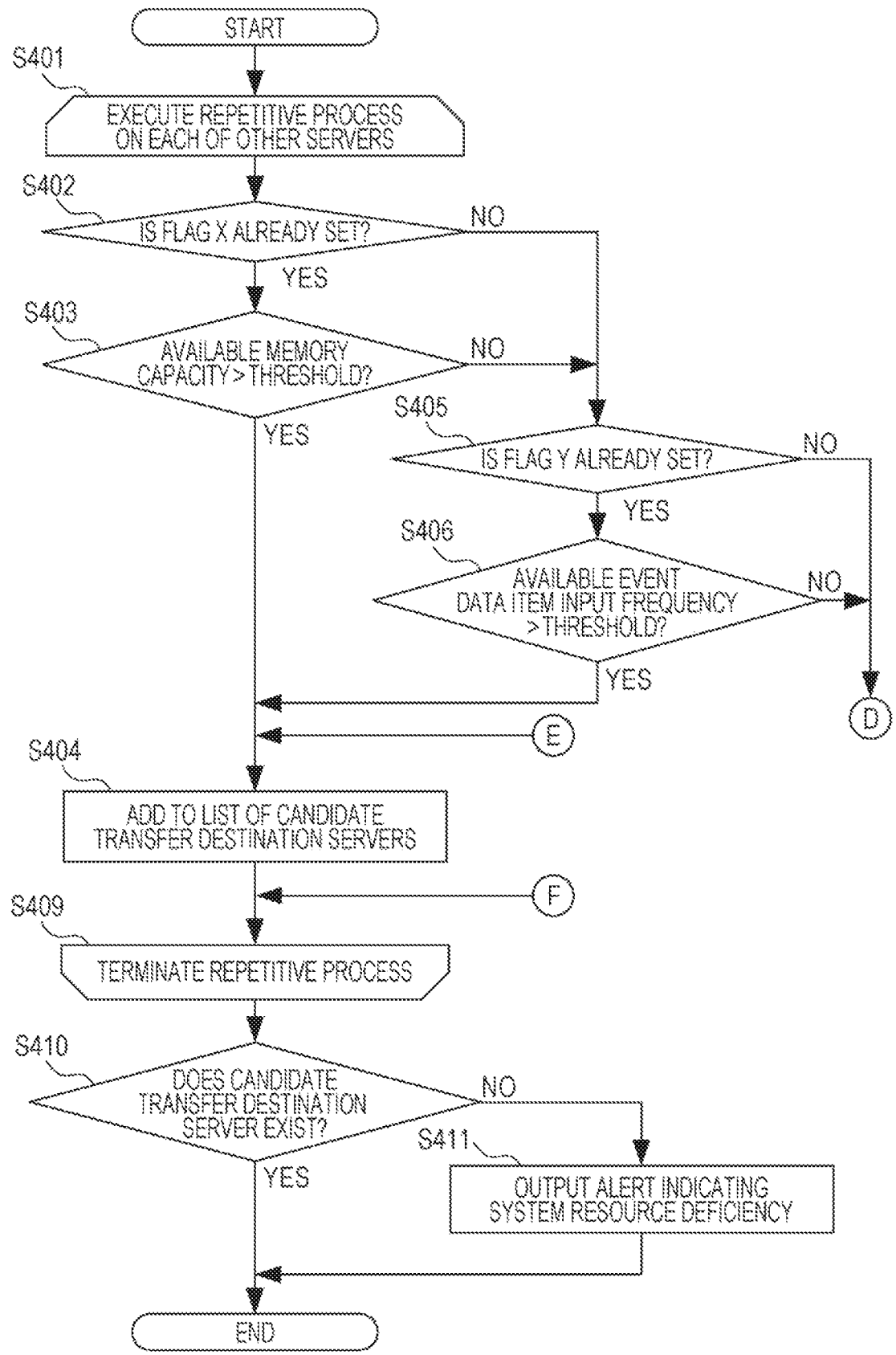
FIG. 23 is a first flowchart illustrating an example of a process of selecting a candidate transfer destination server.
Figure 24:
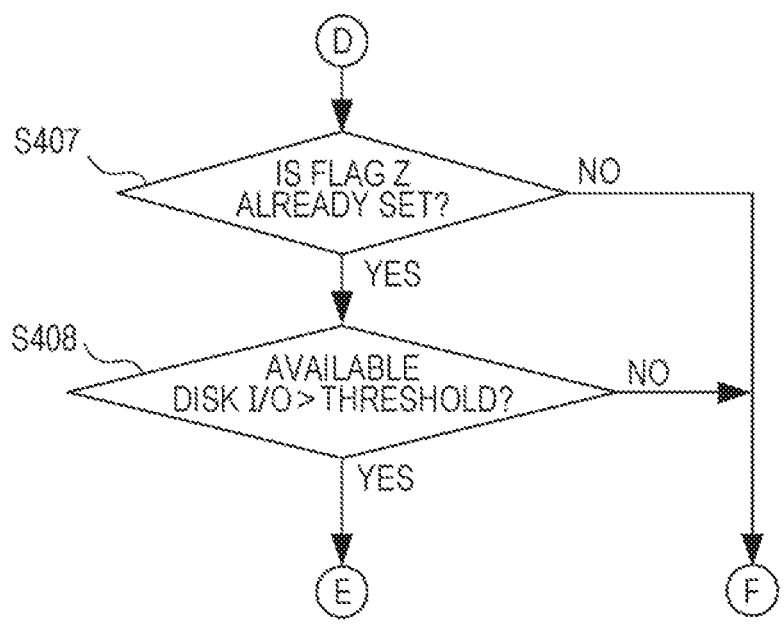
FIG. 24 is a second flowchart illustrating the example of the process of selecting a candidate transfer destination server.

FIGS. 23 and 24 are flowcharts illustrating an example of the process of selecting a candidate transfer destination server. Processes illustrated in FIGS. 23 and 24 are details of step S24 illustrated in FIG. 18.

The candidate transfer destination server selector 34 starts executing a repetitive process on each of the other servers 3 (in step S401). The candidate transfer destination server selector 34 determines whether the flag X is already set in a server 3 to be processed (in step S402). As described above, when the flag X is already set, the flag X indicates that the first determiner 32 has determined that a consumed capacity of the memory is likely to exceed the memory threshold after a predetermined time period. When the answer to the determination of step S402 is YES, the candidate transfer destination server selector 34 determines whether an available capacity of the memory is larger than an available memory capacity threshold (in step S403). When the answer to the determination of step S403 is YES, the candidate transfer destination server selector 34 adds the server 3 to be processed to the list (refer to, for example, FIG. 8) of candidate transfer destination servers (in step S404).

When the answer to the determination of step S402 or S403 is NO, the candidate transfer destination server selector 34 determines whether the flag Y is already set in the server 3 to be processed (in step S405). As described above, when the flag Y is already set, the flag Y indicates that the first determiner 32 has determined that the event data item input frequency exceeds the event data item input frequency threshold after a predetermined time period. When the answer to the determination of step S405 is YES, the candidate transfer destination server selector 34 determines whether an available event data item input frequency is larger than an available event data item input frequency threshold (in step S406). The available event data item input frequency is a value obtained by subtracting the event data item input frequency from the maximum event data item input frequency. When the answer to the determination of step S406 is YES, the candidate transfer destination server selector 34 adds the server 3 to be processed to the list of candidate transfer destination servers (in step S404).

When the answer to the determination of step S405 or S406 is NO, the candidate transfer destination server selector 34 determines whether the flag Z is already set in the server 3 to be processed (in step S407). As described above, when the flag Z is already set, the flag Z indicates that the first determiner 32 has determined that the disk I/O exceeds the disk I/O threshold after a predetermined time period. When the answer to the determination of step S407 is YES, the candidate transfer destination server selector 34 determines whether available disk I/O is larger than an available disk I/O threshold (in step S408). The available disk I/O is a value obtained by subtracting the disk I/O from the maximum disk I/O. When the answer to the determination of step S408 is YES, the candidate transfer destination server selector 34 adds the server 3 to be processed to the list of candidate transfer destination servers (in step S404 illustrated in FIG. 23). When the answer to the determination of step S407 or S408 is NO, the candidate transfer destination server selector 34 terminates the process executed on the server 3 to be processed.

When the processes of steps S402 to S408 are completely executed on all the other servers 3, the candidate transfer destination server selector 34 terminates the repetitive process (in step S409). The candidate transfer destination server selector 34 determines whether a candidate transfer destination server exists in the list of candidate transfer destination servers (in step S410). When the answer to the determination of step S410 is NO, the candidate transfer destination server selector 34 outputs an alert indicating system resource deficiency (in step S411). For example, the candidate transfer destination server selector 34 may cause a display device to display the alert indicating the system resource deficiency or may transmit the alert to the managing device 2.

Figure 25:
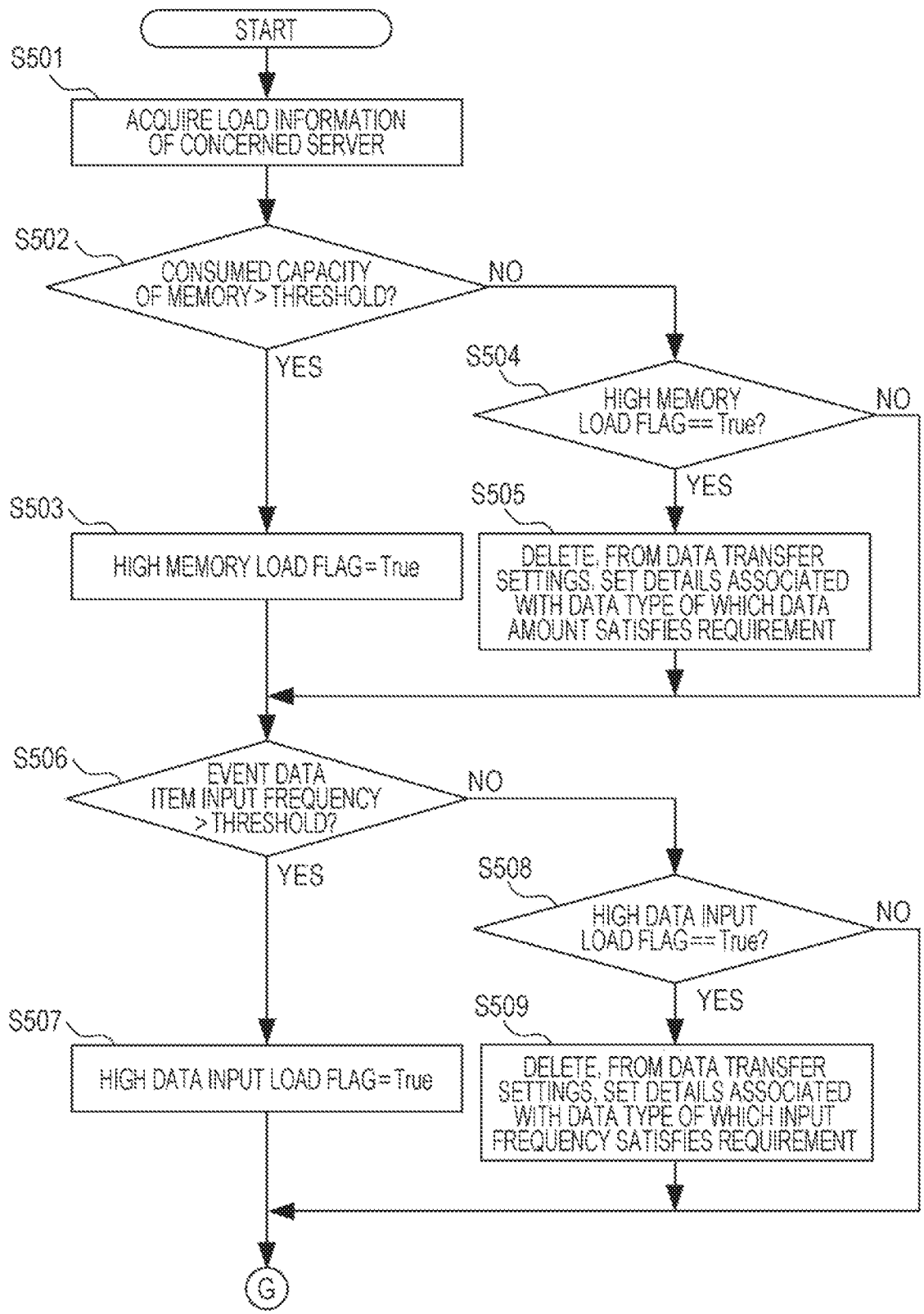
FIG. 25 is a first flowchart illustrating an example of a process of managing transfer settings.
Figure 26:
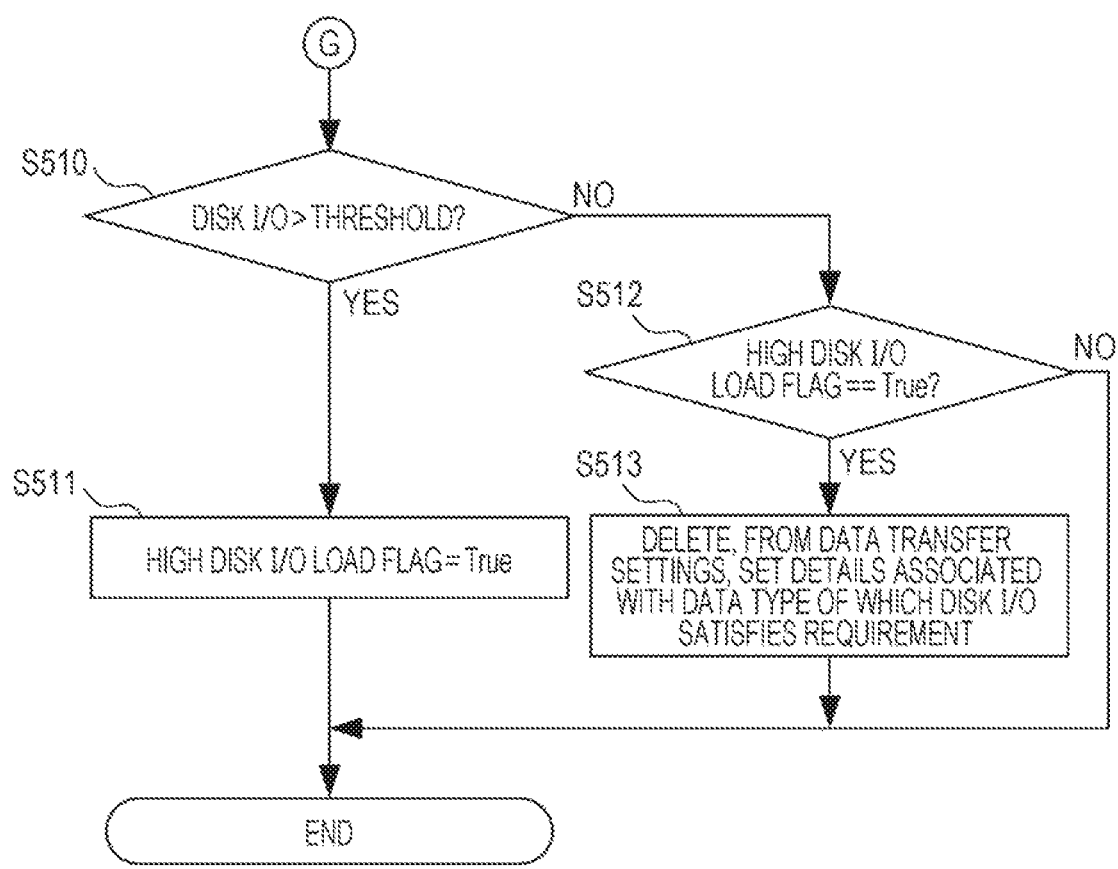
FIG. 26 is a second flowchart illustrating the example of the process of managing transfer settings.

FIGS. 25 and 26 are flowcharts illustrating an example of a process of managing transfer settings. Processes illustrated in FIGS. 25 and 26 are details of step S32 illustrated in FIG. 18. The setting section 35 acquires the load information (for example, a current consumed capacity of the memory, the disk I/O, and the event data item input frequency among the information illustrated in FIG. 4) of the concerned server.

The setting section 35 determines whether the acquired consumed capacity of the memory exceeds a consumed memory capacity threshold (in step S502). When the answer to the determination of step S502 is YES, the setting section 35 sets True in a high memory load flag (in step S503). When the answer to the determination of step S502 is NO, the setting section 35 determines whether True is already set in the high memory load flag (in step S504). When the answer to the determination of step S504 is YES, the setting section 35 deletes, from data transfer settings (refer to, for example, FIG. 9), set details associated with a data type of which a data amount satisfies a requirement (in step S505). The data type of which the data amount satisfies the requirement is a data type of data in an amount (the size of the event data item×the input frequency) smaller than the memory threshold–the consumed capacity of the memory. When the answer to the determination of step S502 is NO and the answer to the determination of step S504 is YES, the memory is highly loaded in the process previously executed but is not highly loaded in the process currently executed. Therefore, when the data amount satisfies the foregoing requirement, the data is able to be stored in the concerned server, and the setting section 35 deletes the data type satisfying the requirement from the data transfer settings.

After the process of step S503, or when the answer to the determination of step S504 is NO, or after the process of S505, the setting section 35 determines whether the acquired event data item input frequency exceeds the event data item input frequency threshold (in step S506). When the answer to the determination of step S506 is YES, the setting section 35 sets True in a high data input load flag (in step S507). When the answer to the determination of step S506 is NO, the setting section 35 determines whether True is already set in the high data input load flag (in step S508). When the answer to the determination of step S508 is YES, the setting section 35 deletes, from the data transfer settings (refer to, for example, FIG. 9), set details associated with a data type of which an event data item input frequency satisfies a requirement (in step S509). The data type of which the event data item input frequency satisfies the requirement is a data type of which an event data item input frequency is smaller than the event data item input frequency threshold–an event data item input frequency (or the total of frequencies with which event data items of all types are input). When the answer to the determination of step S506 is NO and the answer to the determination of step S508 is YES, the event data item input is highly loaded in the process previously executed but is not highly loaded in the process currently executed. When the data amount satisfies the foregoing requirement, the data is able to be stored in the concerned server, and the setting section 35 deletes the data type satisfying the requirement from the data transfer settings.

After the process of step S507, or when the answer to the determination of step S508 is NO, or after the process of step S509, the setting section 35 determines whether the acquired disk I/O exceeds the disk I/O threshold (in step S510 illustrated in FIG. 26). When the answer to the determination of step S510 is YES, the setting section 35 sets True in a high disk I/O load flag (in step S511). When the answer to the determination of step S510 is NO, the setting section 35 determines whether True is already set in the high disk I/O load flag (in step S512). When the answer to the determination of step S512 is YES, the setting section 35 deletes, from the data transfer settings, set details associated with a data type of which disk I/O (the size of the event data item×the input frequency) satisfies a requirement (in step S513). The data type of which the disk I/O satisfies the requirement is a data type of which a data amount is smaller than the disk I/O threshold–the disk I/O. When the answer to the determination of step S510 is NO and the answer to the determination of step S512 is YES, the disk I/O is highly loaded in the process previously executed but is not highly loaded in the process currently executed. Therefore, when the data amount satisfies the foregoing requirement, the data is able to be stored in the concerned server, and the setting section 35 deletes, from the data transfer settings, set details associated with the data type satisfying the requirement.

When the load of the server 3 is reduced by the process illustrated in FIGS. 25 and 26, the server 3 deletes data transfer settings and may avoid the transfer of data able to be stored in the concerned server.

Figure 27:
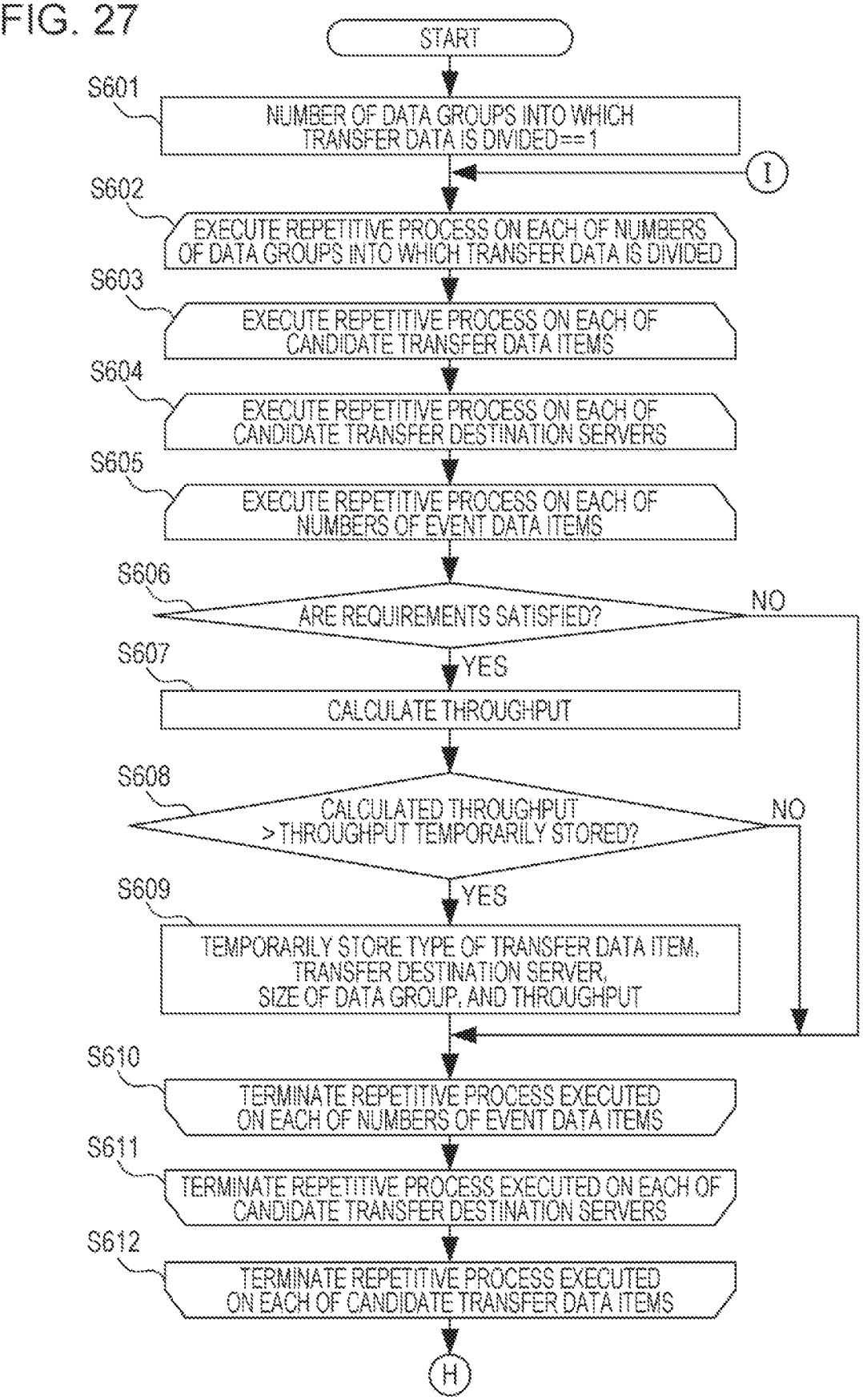
FIG. 27 is a first flowchart illustrating an example of a process of determining transfer settings.
Figure 28:
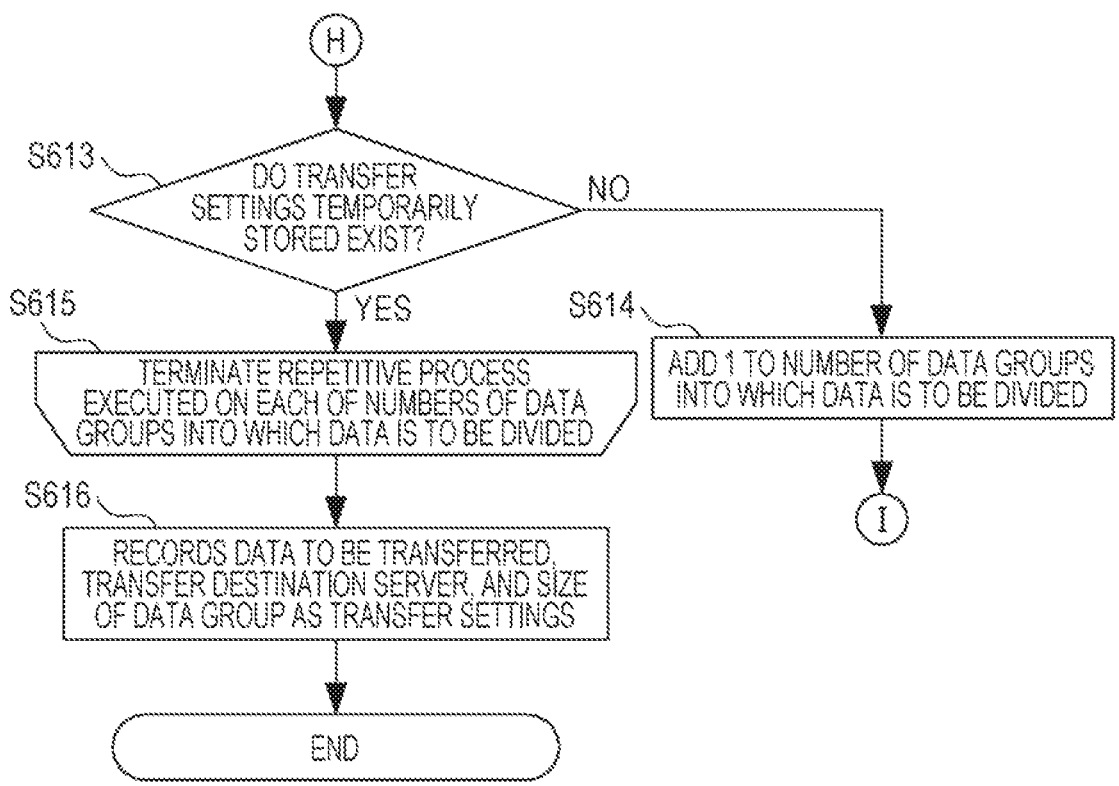
FIG. 28 is a second flowchart illustrating the example of the process of determining transfer settings.

FIGS. 27 and 28 are flowcharts illustrating an example of a process of determining transfer settings. Processes illustrated in FIGS. 27 and 28 are details of step S33 illustrated in FIG. 18.

The second determiner 36 sets 1 to the number of data groups into which transfer data is divided (in step S601). The number of data groups into which the transfer data is divided corresponds to the number of transfer destination servers to which data groups are to be transferred. For example, when the number of data groups into which the transfer data is divided is 1, the transferring section 37 transfers a data group of a data type targeted for transfer to a single server 3. For example, when the number of data groups into which the transfer data is divided is S, the transferring section 37 divides event data items of the data type targeted for the transfer into a number S of data groups and transfers the data groups after the division to a number S of servers 3.

The second determiner 36 starts executing the repetitive process on each of the numbers of data groups into which transfer data is divided (in step S602). For example, the number S of other servers is set as the maximum number of data groups into which transfer data is divided. In this case, the second determiner 36 repeatedly executes the process while the number of other servers is in a range of 1 to n. The second determiner 36 starts executing the repetitive process on each of candidate transfer data items (in step S603). The second determiner 36 starts executing the repetitive process on each of candidate transfer destination servers (in step S604). The second determiner 36 starts executing the repetitive process on each of the numbers of event data items (in step S605). As the maximum number of event data items, a predetermined number N is set in advance. The second determiner 36 executes the repetitive process while the number of event data items is in a range of 1 to N.

The second determiner 36 determines whether the requirements indicated by the foregoing Inequalities (1) to (3) are satisfied (in step S606). When the requirements are satisfied (YES in step S606), the second determiner 36 calculates the throughput based on Equation (4) (in step S607). The second determiner 36 determines whether the throughput calculated in step S607 is larger than throughput temporarily stored (in step S608). When the throughput temporarily stored does not exist in step S608, the second determiner 36 causes the process to proceed to a process of step S609. When the answer to the determination of step S608 is YES, the second determiner 36 associates a candidate transfer destination server to be processed, a data group size, and the throughput calculated according to Equation (4) with a data type of a candidate transfer data item and temporarily stores, as data transfer settings, the candidate transfer destination server to be processed, the data group size, and the throughput calculated according to Equation (4) (in step S609). The candidate transfer data item stored as a data transfer setting is referred to as data to be transferred. The second determiner 36 calculates the data group size by multiplying the number of event data items to be currently processed by the size of each of the event data items. When data transfer settings temporarily stored exist, the second determiner 36 writes, over the data transfer settings temporarily stored, the type of the candidate transfer data item to be processed, the candidate transfer destination server to be processed, the data group size, and the calculated throughput.

When the second determiner 36 executes the processes of steps S606 to S609 on all the numbers of event data items, the second determiner 36 terminates the repetitive process executed on each of the numbers of event data items (in step S610). When the second determiner 36 executes the processes of steps S605 to S610 on all the candidate transfer destination servers, the second determiner 36 terminates the repetitive process executed on each of the candidate transfer destination servers (in step S611). When the second determiner 36 executes the processes of steps S604 to S611 on all the candidate transfer data items, the second determiner 36 terminates the repetitive process executed on each of the candidate transfer data items (in step S612).

After the process of step S612, the second determiner 36 determines whether the number of transfer destination servers and the number of event data items are already temporarily stored as data transfer settings (in step S613 illustrated in FIG. 28). When the answer to the determination of step S613 is YES, the second determiner 36 terminates the process executed on the number of data groups into which data is to be processed is divided. When the answer to the determination of step S613 is NO, the second determiner 36 adds 1 to the number of data groups into which the data is divided (in step S614), and the second determiner 36 causes the process to proceed to step S602. When the answer to the determination of step S613 is NO, the negative answer indicates that a combination of transfer data, a transfer destination server, and a data group size, which satisfies the requirements in the process of step S606, does not exist for the number of data groups into which the data to be processed is divided. Thus, the second determiner 36 increases the number of data groups into which the data is divided, increases the number of transfer destination servers, and determines again whether a combination of transfer data, a transfer destination server, and a data group size, which satisfies the requirements in the process of step S606, exists.

When the second determiner 36 executes the processes of steps S603 to S613 until the number of data groups into which the data is divided becomes equal to the maximum number of data groups into which the data is divided, the second determiner 36 terminates the repetitive process executed on each of the numbers of data groups into which the data is divided (in step S615). After the process of step S615, the second determiner 36 associates the temporarily stored ID of the transfer destination server and the data group size with the data type of the data to be transferred and records the ID of the transfer destination server and the data group size as data transfer settings (refer to, for example, FIG. 9) (in step S616). When the number of data groups into which the transfer data is divided are 2 or greater, the second determiner 36 writes ratios of data group sizes for transfer destination servers as data transfer settings.

When the transfer destination server and the data group size that satisfy the requirements in step S606 do not exist until the number of data groups into which the data is divided becomes equal to the maximum value, the data of the data type is not to be transferred. For example, the second determiner 36 determines data to be transferred among the candidate transfer data items in the processes illustrated in FIGS. 27 and 28.

Figure 29:
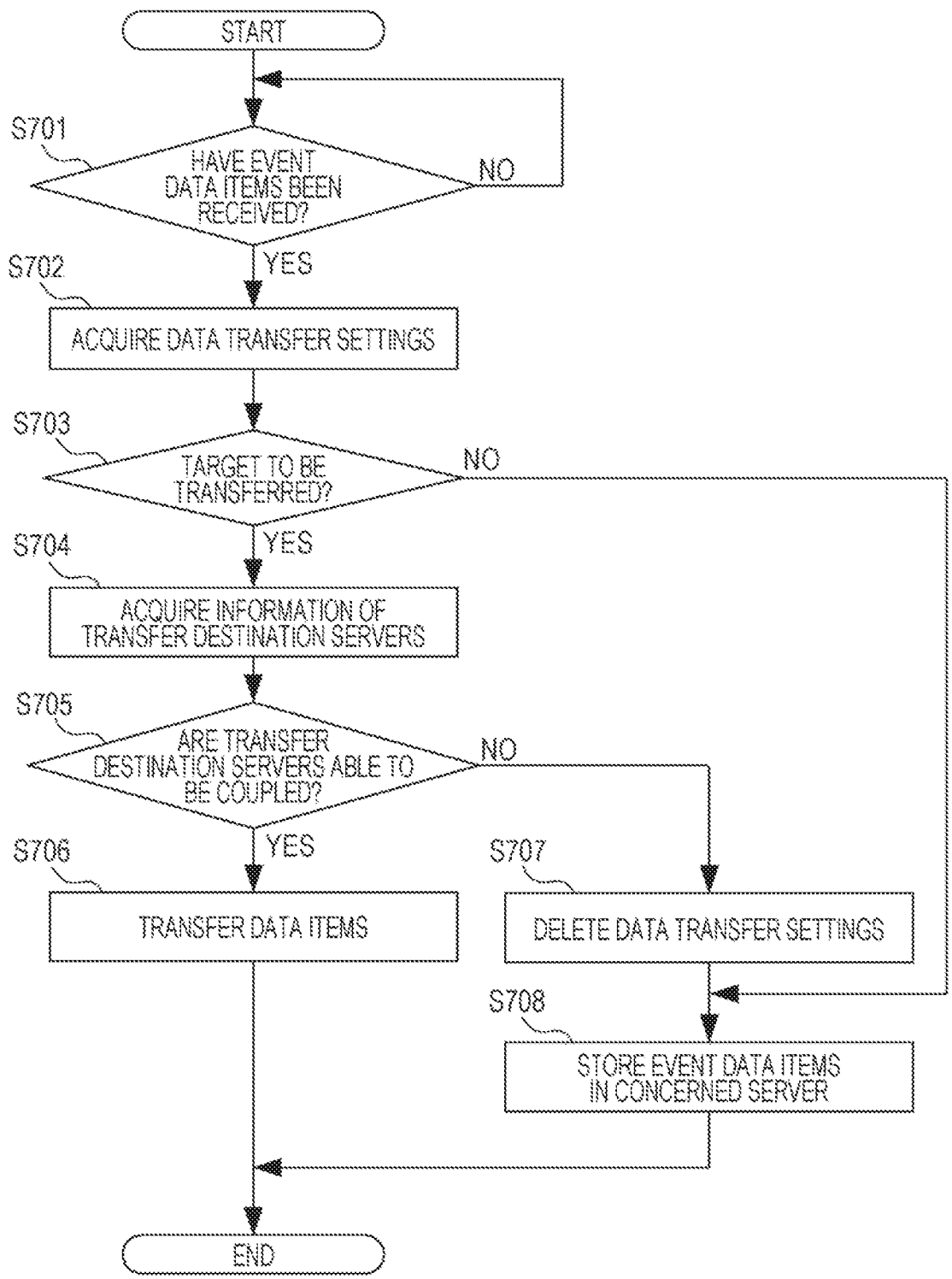
FIG. 29 is a flowchart illustrating an example of a transfer process.

FIG. 29 is a flowchart illustrating an example of a transfer process. Processes illustrated in FIG. 29 are details of step S42 illustrated in FIG. 18. The transferring section 37 determines whether the receiver 30 has received event data items (in step S701). When the receiver 30 has not received the event data items (NO in step S701), the transferring section 37 stands by until the receiver 30 receives the event data items.

When the receiver 30 has received the event data items (YES in step S710), the transferring section 37 acquires data transfer settings (refer to, for example, FIG. 9) associated with a type of the event data items (in step S702). When the process (illustrated in FIGS. 27 and 28) of determining data transfer settings associated with the type of the received event data items is not completed, the transferring section 37 stands by until the process of determining data transfer settings is completed.

The transferring section 37 determines whether the type of the received event data items indicates a target to be transferred (in step S703). For example, the transferring section 37 determines whether the type of the received event data items is included in data transfer settings. When the answer to the destination of step S703 is YES, the transferring section 37 acquires information (for example, an IP address) of servers 3 (transfer destination servers) that are destinations of the data items to be transferred (in step S704). It is assumed that the information of the other servers 3 is stored in the manage information storage section 38 in advance.

The transferring section 37 determines whether the transfer destination servers are able to be coupled (in step S705). For example, when the transferring section 37 transmits a command to confirm the coupling to the transfer destination servers and receives responses, the transferring section 37 determines that the transfer destination servers are able to be coupled. When the answer to the destination of step S705 is YES, the transferring section 37 transfers data groups including the event data items to the respective transfer destination servers (in step S706). It is assumed that the sizes of the data groups at the time of the transfer are equal to a size recorded in the data transfer settings. When the answer to the destination of step S705 is NO, the transferring section 37 deletes data transfer settings related to the transfer destination servers (in step S707). After the process of step S707 or when the answer to the destination of step S703 is NO, the server 3 stores the event data items in the data storage section 39 of the concerned server (in step S708).

Since the server 3 determines, based on throughput, data to be transferred, a transfer destination server, and a data group size at the time of the transfer after narrowing down candidate data to be transferred and candidate transfer destination servers 3, the amount of calculation to determine the foregoing may be suppressed. Even when it is difficult to store data in a server 3, the concerned server may transfer the data to another server 3, and the data may be used by an information processing terminal 5.

Next, an example of a hardware configuration of each of the servers 3 is described. FIG. 30 is a diagram illustrating the example of the hardware configuration of each of the servers 3. As indicated in the example of FIG. 30, in the server 3, a processor 111, a memory 112, an auxiliary storage device 113, a communication interface 114, a medium coupling unit 115, an input device 116, and an output device 117 are coupled to a bus 100.

The processor 111 executes a program loaded in the memory 112. A transfer program for executing the processes according to the embodiment may be applied to the program to be executed.

The memory 112 is, for example, a random-access memory (RAM). The auxiliary storage device 113 stores various information. For example, a hard disk drive, a semiconductor memory, or the like may be applied to the auxiliary storage device 113. The transfer program for executing the processes according to the embodiment may be stored in the auxiliary storage device 113.

The communication interface 114 is coupled to a communication network, such as a local area network (LAN) or a wide area network (WAN), and executes data conversion and the like for communication.

The medium coupling unit 115 is an interface able to be coupled to a portable recording medium 118. An optical disc (for example, a compact disc (CD), a digital versatile disc (DVD), or the like), a semiconductor memory, or the like may be applied to the portable recording medium 118. The transfer program for executing the processes according to the embodiment may be recorded in the portable recording medium 118.

The input device 116 is, for example, a keyboard, a pointing device, or the like and receives input of an instruction, information, and the like from a user.

The output device 117 is, for example, a display device, a printer, a speaker, or the like and outputs an inquiry or an instruction, a process result, and the like to the user.

The manage information storage section 38 illustrated in FIG. 2 may be enabled by the memory 112, the auxiliary storage device 113, the portable recording medium 118, or the like. The data storage section 39 illustrated in FIG. 2 may be enabled by the auxiliary storage device 113, the portable recording medium 118, or the like. The manager 31, the first determiner 32, the candidate transfer data item selector 33, the candidate transfer destination server selector 34, the setting section 35, the second determiner 36, and the transferring section 37, which are illustrated in FIG. 1, may be enabled by causing the processor 111 to execute the transfer program loaded in the memory 112.

Each of the memory 112, the auxiliary storage device 113, the portable recording medium 118 is a computer-readable, non-transitory, tangible recording medium and is not a temporal medium, such as a signal carrier wave.

Each of the servers 3 may not include all the constituent components illustrated in FIG. 30. Some of the constituent components may be omitted. Some of the constituent components may be installed in an external device of the servers 3. The servers 3 may be coupled to the external device and may use the constituent components within the external device.

The embodiment is not limited to the foregoing embodiment. Various changes, addition, and omission may be made without departing from the gist of the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a transfer program that causes an information processing apparatus to execute a process, the process comprising:

receiving data including several data types;

selecting, based on a load status of the information processing apparatus that has received the data, candidate transfer data that is among the data and to be transferred to one or more other information processing apparatuses, for each of the several data types, the load status of the information processing apparatus includes a consumed capacity of a memory temporarily storing the data, a frequency with which the data is input to the information processing apparatus, and amounts of data input and data output to and from a storage device in the information processing apparatus;

selecting, based on respective load statuses of multiple other information processing apparatuses, one or more candidate transfer destination apparatuses that are from among the multiple other information processing apparatuses and are candidate transfer destinations of the data, the respective load statuses of the multiple other information processing apparatuses include consumed capacities of memories included in the multiple other information processing apparatuses temporarily storing the data, frequencies with which the data is input to the multiple other information processing apparatuses, and amounts of data input and data output to and from storage devices included in the multiple other information processing apparatuses;

determining, based on throughput between the information processing apparatus and the one or more candidate transfer destination apparatuses,
data to be transferred to the one or more candidate transfer destination apparatuses, and
sizes of data groups including the data to be transferred, for each of the several data types; and transferring, to transfer destination apparatuses determined, from among the one or more candidate transfer destination apparatuses, for the determined data groups, the determined data to be transferred.

2. The computer-readable recording medium according to claim 1, wherein
the determining includes determining the data to be transferred, the transfer destination apparatuses, and the sizes of the data groups so that a time period from time when an information processing terminal transmits the data to the information processing apparatus to time when another information processing terminal receives the data is equal to or shorter than a predetermined time period.

3. The computer-readable recording medium according to claim 1, the process further comprising:
recording, as data transfer settings, identification information indicating the determined data to be transferred, identification information indicating the transfer destination apparatuses; and the sizes of the data groups; and
deleting the data transfer settings when a load of the information processing apparatus decreases.

4. A transfer method performed by an information processing apparatus for transmitting data, the method comprising:
receiving data including several data types;
selecting, based on a load status of the information processing apparatus that has received the data, candidate transfer data that is among the data and to be transferred to one or more other information processing apparatuses, for each of the several data types,
the load status of the information processing apparatus includes a consumed capacity of a memory temporarily storing the data, a frequency with which the data is input to the information processing apparatus, and amounts of data input and data output to and from a storage device in the information processing apparatus;
selecting, based on respective load statuses of multiple other information processing apparatuses, one or more candidate transfer destination apparatuses that are from among the multiple other information processing apparatuses and are candidate transfer destinations of the data,
the respective load statuses of the multiple other information processing apparatuses include consumed capacities of memories included in the multiple other information processing apparatuses temporarily storing the data, frequencies with which the data is input to the multiple other information processing apparatuses, and amounts of data input and data output to and from storage devices included in the multiple other information processing apparatuses;

determining, based on throughput between the information processing apparatus and the one or more candidate transfer destination apparatuses,
data to be transferred to the one or more candidate transfer destination apparatuses, and
sizes of data groups including the data to be transferred, for each of the several data types; and transferring, to transfer destination apparatuses determined, from among the one or more candidate transfer destination apparatuses, for the determined data groups, the determined data to be transferred.

5. An information processing apparatus comprising:
a memory, and
a processor coupled to the memory and configured to:
receive data including several data types;
select, based on a load status of the information processing apparatus that has received the data, candidate transfer data that is among the data and to be transferred to one or more other information processing apparatuses, for each of the several data types,
the load status of the information processing apparatus includes a consumed capacity of a memory temporarily storing the data, a frequency with which the data is input to the information processing apparatus, and amounts of data input and data output to and from a storage device in the information processing apparatus;
select, based on respective load statuses of multiple other information processing apparatuses, one or more candidate transfer destination apparatuses that are from among the multiple other information processing apparatuses and are candidate transfer destinations of the data,
the respective load statuses of the multiple other information processing apparatuses include consumed capacities of memories included in the multiple other information processing apparatuses temporarily storing the data, frequencies with which the data is input to the multiple other information processing apparatuses, and amounts of data input and data output to and from storage devices included in the multiple other information processing apparatuses;
determine, based on throughput between the information processing apparatus and the one or more candidate transfer destination apparatuses,
data to be transferred to the one or more candidate transfer destination apparatuses, and
sizes of data groups including the data to be transferred, for each of the several data types; and
transfer, to transfer destination apparatuses determined, from among the one or more candidate transfer destination apparatuses, for the determined data groups, the determined data to be transferred.

* * * * *